US012579439B2

(12) United States Patent     (10) Patent No.:   US 12,579,439 B2

Hirimbura Matara Kankanamge et al.     (45) Date of Patent:     Mar. 17, 2026

(54) KERNELIZED CLASSIFIERS IN NEURAL NETWORKS

(71) Applicant: Google LLC, Mountain View, CA (US)

(72) Inventors: Gayan Sadeep Jayasumana Hirimbura Matara Kankanamge, Houston, TX (US); Srikumar Ramalingam, West Windsor, NJ (US); Sanjiv Kumar, Jericho, NY (US)

(73) Assignee: Google LLC, Mountain View, CA (US)

( * ) Notice: Subject to any disclaimer, the term of this patent is extended or adjusted under 35 U.S.C. 154(b) by 1284 days.

(21) Appl. No.: 17/245,892

(22) Filed: Apr. 30, 2021

(65) Prior Publication Data

US 2022/0366260 A1     Nov. 17, 2022

(51) Int. Cl.
| | |
|---|---|
| *G06F 17/00* | (2019.01) |
| *G06F 18/211* | (2023.01) |
| *G06F 18/214* | (2023.01) |
| *G06F 18/2431* | (2023.01) |
| *G06N 3/048* | (2023.01) |
| *G06N 3/084* | (2023.01) |

(52) U.S. Cl.
CPC ........... *G06N 3/084* (2013.01); *G06F 18/211* (2023.01); *G06F 18/214* (2023.01); *G06F 18/2431* (2023.01); *G06N 3/048* (2023.01)

(58) Field of Classification Search
CPC ........ G06N 3/084; G06N 3/048; G06N 3/045; G06N 3/08; G06N 3/04; G06F 18/211; G06F 18/214; G06F 18/2431
USPC .......................................................... 706/15
See application file for complete search history.

(56) References Cited

U.S. PATENT DOCUMENTS

| | | | | |
|---|---|---|---|---|
| 11,429,865 | B1* | 8/2022 | Patton | G06N 3/082 |
| 2014/0257805 | A1* | 9/2014 | Huang | G06N 3/045 |
| | | | | 704/232 |
| 2018/0239989 | A1* | 8/2018 | Pan | G06F 18/253 |
| 2018/0276244 | A1* | 9/2018 | Popescu | G06F 16/583 |
| 2019/0065950 | A1* | 2/2019 | Li | G06F 18/2414 |
| 2020/0005074 | A1* | 1/2020 | Wang | G06V 20/70 |

(Continued)

OTHER PUBLICATIONS

Jayasumana et al., "Kernelized Classification in Deep Networks," arXiv:2012.09607v2, Mar. 18, 2021, 10 pages.

*Primary Examiner* — Jason T Edwards
(74) *Attorney, Agent, or Firm* — McDonnell Boehnen Hulbert & Berghoff LLP

(57) ABSTRACT

A method includes receiving, by a computing device, training data to train a neural network, wherein the training data comprises a plurality of inputs and a plurality of corresponding labels. The method also includes mapping, by a representation learner of the neural network, the plurality of inputs to a plurality of feature vectors. The method additionally includes training a kernelized classification layer of the neural network to perform nonlinear classification of an input feature vector into one of a plurality of classes, wherein the kernelized classification layer is based on a kernel which enables the nonlinear classification, and wherein the kernel is selected from a space of positive definite kernels based on application of a nonlinear softmax loss function to the plurality of feature vectors and the plurality of corresponding labels. The method further includes outputting a trained neural network comprising the representation learner and the trained kernelized classification layer.

22 Claims, 10 Drawing Sheets

┌─1400

1410 Receiving, by a computing device, training data to train a neural network, wherein the training data comprises a plurality of inputs and a plurality of corresponding labels

↓

1420 Mapping, by a representation learner of the neural network, the plurality of inputs to a plurality of feature vectors

↓

1430 Training a kernelized classification layer of the neural network to perform nonlinear classification of an input feature vector into one of a plurality of classes, wherein the kernelized classification layer is based on a kernel which enables the nonlinear classification, and wherein the kernel is selected from a space of positive definite kernels based on application of a nonlinear softmax loss function to the plurality of feature vectors and the plurality of corresponding labels

↓

1440 Outputting a trained neural network comprising the representation learner and the trained kernelized classification layer

(56)                    References Cited

U.S. PATENT DOCUMENTS

| | | | | |
|---|---|---|---|---|
| 2020/0311572 A1* | 10/2020 | Baker | ...................... | G06N 5/04 |
| 2020/0334449 A1* | 10/2020 | Chen | ................... | G06V 40/165 |
| 2020/0364303 A1* | 11/2020 | Liu | ........................ | G10L 15/16 |
| 2021/0103814 A1* | 4/2021 | Tsiligkaridis | ............ | G06N 3/08 |
| 2021/0142106 A1* | 5/2021 | Quader | ................. | G06N 3/045 |
| 2021/0233511 A1* | 7/2021 | Li | ........................... | G06N 3/04 |
| 2022/0284283 A1* | 9/2022 | Yin | ......................... | G06N 3/04 |
| 2022/0318296 A1* | 10/2022 | Vang | ................. | G06F 16/5838 |
| 2024/0073337 A1* | 2/2024 | Harris | ................. | G06V 10/764 |

* cited by examiner

| Method | Accuracy |
|--------|----------|
| Softmax classifier (baseline) | 85.51 |
| Kernelized classifier (ours) | 94.20 |
| Bayes optimal classifier | 95.06 |

| Backbone | SM | LIN | SOP | KER | Ours |
|----------|------|------|------|------|--------|
| ResNet-8 | 83.73 | 82.45 | 84.03 | 85.15 | 86.93 |
| ResNet-14 | 89.87 | 90.16 | 90.47 | 90.41 | 91.48 |
| ResNet-20 | 91.14 | 91.01 | 91.75 | 91.34 | 92.88 |
| ResNet-32 | 92.22 | 92.21 | 92.31 | 92.41 | 93.70 |
| ResNet-44 | 92.10 | 93.10 | 92.42 | 92.87 | 94.05 |
| ResNet-56 | 93.01 | 93.13 | 93.33 | 93.09 | 94.15 |

| Backbone | SM | LIN | SOP | KER | Ours |
|----------|------|------|------|------|--------|
| ResNet-8 | 53.82 | 54.00 | 55.80 | 56.86 | 58.27 |
| ResNet-14 | 63.85 | 63.67 | 63.53 | 64.14 | 66.67 |
| ResNet-20 | 65.99 | 65.79 | 67.97 | 67.31 | 69.33 |
| ResNet-32 | 68.96 | 69.16 | 70.39 | 69.40 | 71.30 |
| ResNet-44 | 70.16 | 70.54 | 71.13 | 71.09 | 73.20 |
| ResNet-56 | 71.23 | 72.11 | 73.12 | 72.39 | 74.10 |

| Method | Accuracy | |
|---|---|---|
| | Baseline | Ours |
| Oxford-IIIT Pets | 92.06 | 93.56 |
| Stanford Cars | 90.78 | 92.60 |

| Method | Accuracy | |
|---|---|---|
| | Baseline | Ours |
| CIFAR-10 | 76.06 | 79.85 |
| CIFAR-100 | 44.38 | 46.48 |

| % | Baseline | | | Ours | | |
|---|---|---|---|---|---|---|
| | rnd | mgn | k-ctr | rnd | mgn | k-ctr |
| 30 | 58.03 | 58.88 | 58.41 | 61.66 | 61.80 | 63.08 |
| 40 | 61.05 | 61.81 | 62.02 | 65.25 | 66.28 | 66.35 |
| 50 | 64.81 | 65.36 | 65.47 | 67.17 | 68.14 | 69.41 |
| 60 | 66.26 | 67.03 | 68.25 | 69.17 | 70.61 | 70.10 |
| 70 | 67.47 | 69.16 | 69.84 | 70.06 | 70.90 | 71.50 |
| 80 | 69.59 | 69.47 | 71.25 | 71.66 | 72.21 | 72.64 |
| 90 | 70.25 | 71.41 | 71.11 | 72.60 | 73.90 | 73.14 |

| Method | Accuracy |
| --- | --- |
| Gaussian RBF kernel | 73.21 |
| Polynomial kernel | 73.16 |
| Learned kernel | 74.10 |

| Method | Accuracy |
| --- | --- |
| Softmax classifier with: | |
| rectified features | 70.96 |
| unrectified features | 71.23 |
| Kernelized classifier with: | |
| rectified features | 71.61 |
| unrectified features | 74.10 |

| Activation function | Accuracy |
| --- | --- |
| sigmoid | 74.96 |
| softmax | 73.69 |
| ReLU | 74.10 |
| None (linear) | unstable |

Figure 14:
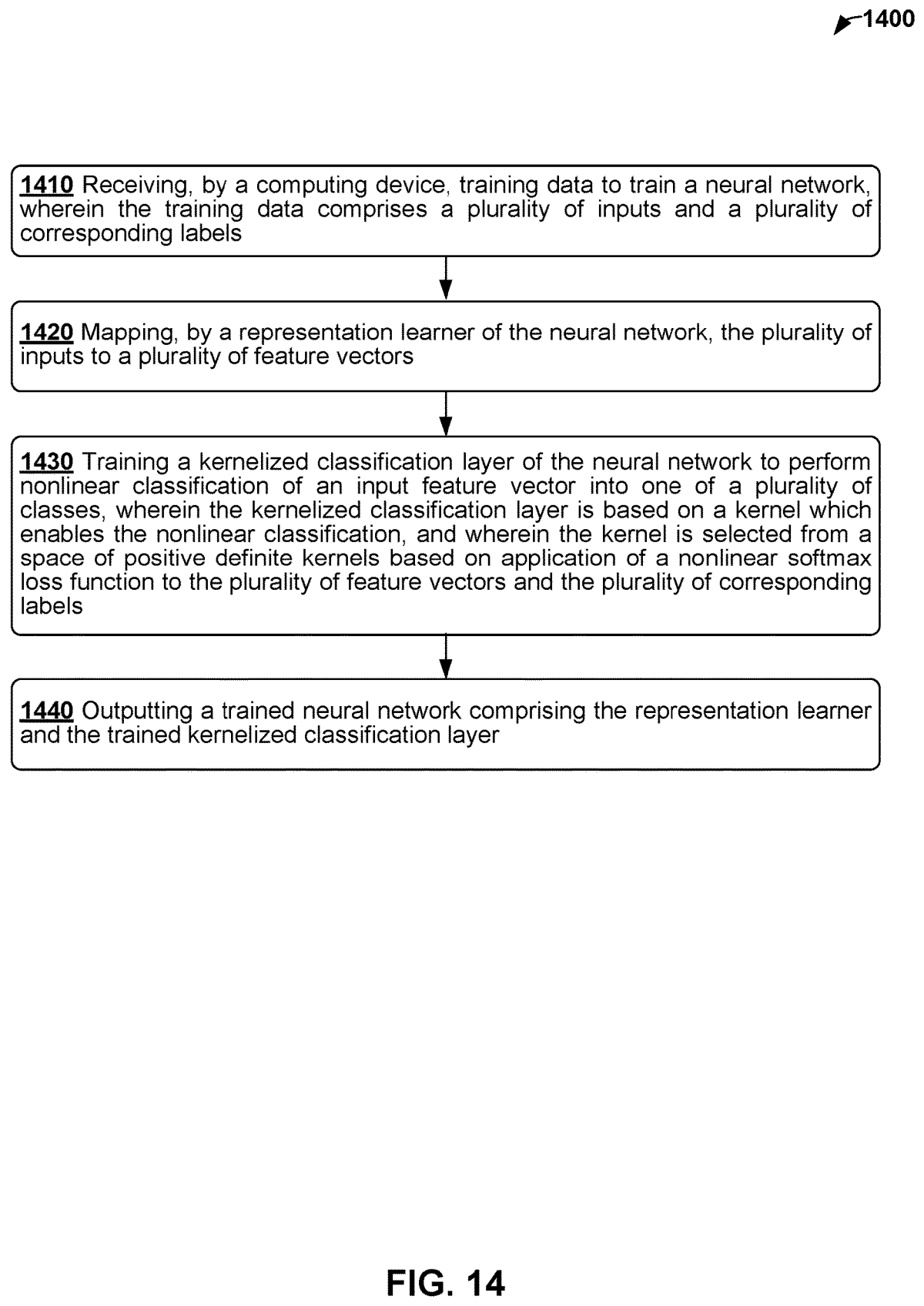

1410 Receiving, by a computing device, training data to train a neural network, wherein the training data comprises a plurality of inputs and a plurality of corresponding labels

1420 Mapping, by a representation learner of the neural network, the plurality of inputs to a plurality of feature vectors

1430 Training a kernelized classification layer of the neural network to perform nonlinear classification of an input feature vector into one of a plurality of classes, wherein the kernelized classification layer is based on a kernel which enables the nonlinear classification, and wherein the kernel is selected from a space of positive definite kernels based on application of a nonlinear softmax loss function to the plurality of feature vectors and the plurality of corresponding labels

1440 Outputting a trained neural network comprising the representation learner and the trained kernelized classification layer

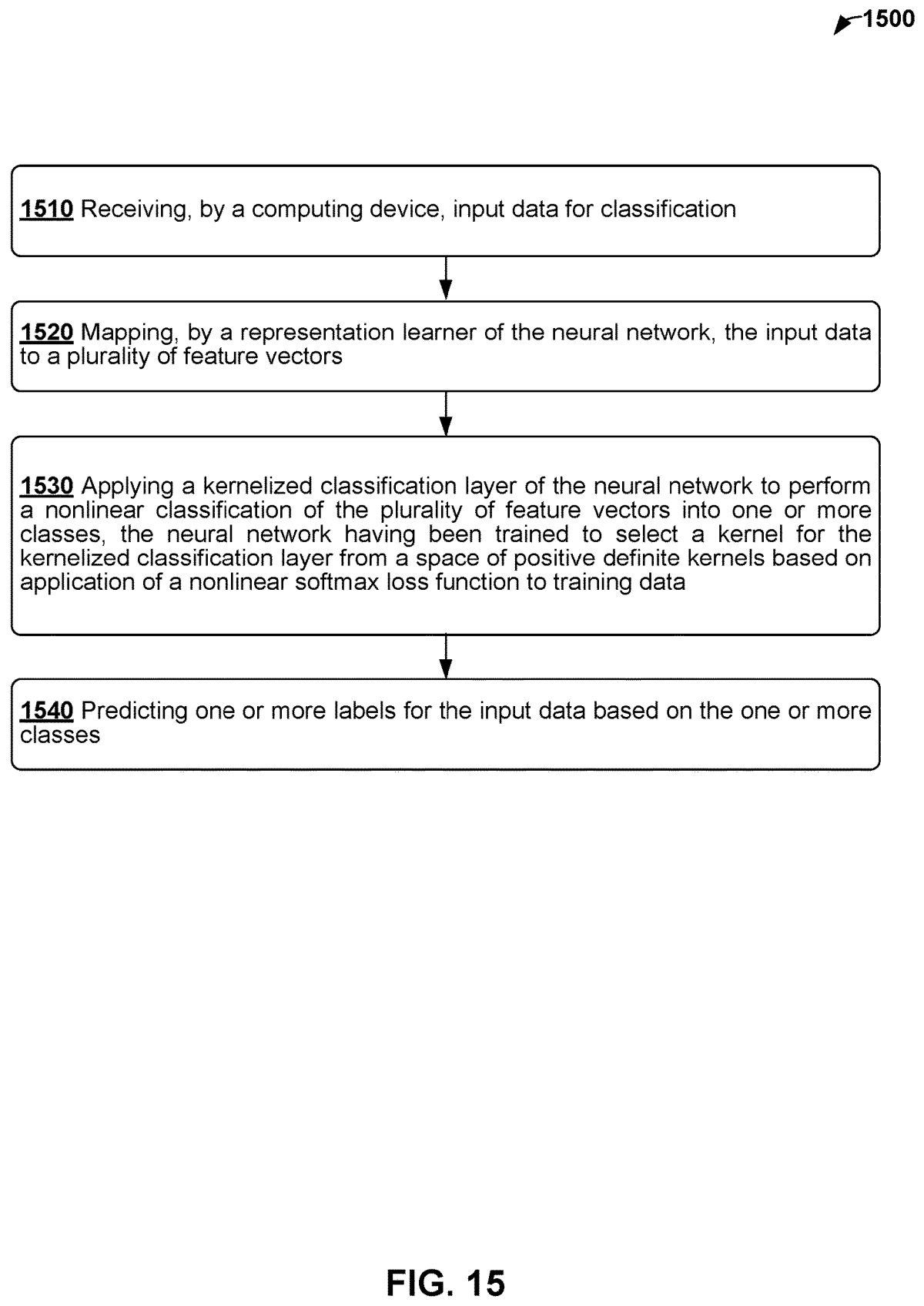

1510 Receiving, by a computing device, input data for classification

1520 Mapping, by a representation learner of the neural network, the input data to a plurality of feature vectors

1530 Applying a kernelized classification layer of the neural network to perform a nonlinear classification of the plurality of feature vectors into one or more classes, the neural network having been trained to select a kernel for the kernelized classification layer from a space of positive definite kernels based on application of a nonlinear softmax loss function to training data

1540 Predicting one or more labels for the input data based on the one or more classes

FIG. 15

KERNELIZED CLASSIFIERS IN NEURAL NETWORKS

BACKGROUND

Neural networks can be trained to predict representations of input data. In some aspects, input data can be represented as feature vectors, and the feature vectors can be classified based on a linear classifier. For example, convolution and max-pooling can be used to obtain a vector representation of image data, and the image data can be classified into an appropriate class by using a fully-connected layer operating on the vector representation. In some instances, the classes may not be linearly separable in the space of feature vectors. Higher dimensional embeddings of such classes may be used to facilitate application of a linear classifier. Generally, a neural network is trained based on a predetermined linear classifier.

SUMMARY

In one aspect, a computer-implemented method is provided. The method includes receiving, by a computing device, training data to train a neural network, wherein the training data comprises a plurality of inputs and a plurality of corresponding labels. The method also includes mapping, by a representation learner of the neural network, the plurality of inputs to a plurality of feature vectors. The method additionally includes training a kernelized classification layer of the neural network to perform nonlinear classification of an input feature vector into one of a plurality of classes, wherein the kernelized classification layer is based on a kernel which enables the nonlinear classification, and wherein the kernel is selected from a space of positive definite kernels based on application of a nonlinear softmax loss function to the plurality of feature vectors and the plurality of corresponding labels. The method further includes outputting a trained neural network comprising the representation learner and the trained kernelized classification layer.

In a second aspect, a computing device is provided. The computing device includes one or more processors and data storage. The data storage has stored thereon computer-executable instructions that, when executed by one or more processors, cause the computing device to carry out functions. The functions include: receiving, by a computing device, training data to train a neural network, wherein the training data comprises a plurality of inputs and a plurality of corresponding labels; mapping, by a representation learner of the neural network, the plurality of inputs to a plurality of feature vectors; training a kernelized classification layer of the neural network to perform nonlinear classification of an input feature vector into one of a plurality of classes, wherein the kernelized classification layer is based on a kernel which enables the nonlinear classification, and wherein the kernel is selected from a space of positive definite kernels based on application of a nonlinear softmax loss function to the plurality of feature vectors and the plurality of corresponding labels; and outputting a trained neural network comprising the representation learner and the trained kernelized classification layer.

In a third aspect, an article of manufacture is provided. The article of manufacture includes one or more computer readable media having computer-readable instructions stored thereon that, when executed by one or more processors of a computing device, cause the computing device to carry out functions. The functions include: receiving, by a computing device, training data to train a neural network, wherein the training data comprises a plurality of inputs and a plurality of corresponding labels; mapping, by a representation learner of the neural network, the plurality of inputs to a plurality of feature vectors; training a kernelized classification layer of the neural network to perform nonlinear classification of an input feature vector into one of a plurality of classes, wherein the kernelized classification layer is based on a kernel which enables the nonlinear classification, and wherein the kernel is selected from a space of positive definite kernels based on application of a nonlinear softmax loss function to the plurality of feature vectors and the plurality of corresponding labels; and outputting a trained neural network comprising the representation learner and the trained kernelized classification layer.

In a fourth aspect, a system is provided. The system includes means for receiving, by a computing device, training data to train a neural network, wherein the training data comprises a plurality of inputs and a plurality of corresponding labels; means for mapping, by a representation learner of the neural network, the plurality of inputs to a plurality of feature vectors; means for training a kernelized classification layer of the neural network to perform nonlinear classification of an input feature vector into one of a plurality of classes, wherein the kernelized classification layer is based on a kernel which enables the nonlinear classification, and wherein the kernel is selected from a space of positive definite kernels based on application of a nonlinear softmax loss function to the plurality of feature vectors and the plurality of corresponding labels; and means for outputting a trained neural network comprising the representation learner and the trained kernelized classification layer.

In a fifth aspect, a computer-implemented method is provided. The method includes receiving, by a computing device, input data for classification. The method also includes mapping, by a representation learner of the neural network, the input data to a plurality of feature vectors. The method additionally includes applying a kernelized classification layer of the neural network to perform a nonlinear classification of the plurality of feature vectors into one or more classes, the neural network having been trained to select a kernel for the kernelized classification layer from a space of positive definite kernels based on application of a nonlinear softmax loss function to training data. The method further includes predicting one or more labels for the input data based on the one or more classes.

In a sixth aspect, a computing device is provided. The computing device includes one or more processors and data storage. The data storage has stored thereon computer-executable instructions that, when executed by one or more processors, cause the computing device to carry out functions. The functions include: receiving, by a computing device, input data for classification; mapping, by a representation learner of the neural network, the input data to a plurality of feature vectors; applying a kernelized classification layer of the neural network to perform a nonlinear classification of the plurality of feature vectors into one or more classes, the neural network having been trained to select a kernel for the kernelized classification layer from a space of positive definite kernels based on application of a nonlinear softmax loss function to training data; and predicting one or more labels for the input data based on the one or more classes.

In a seventh aspect, an article of manufacture is provided. The article of manufacture includes one or more computer readable media having computer-readable instructions stored thereon that, when executed by one or more processors of a computing device, cause the computing device to carry out functions. The functions include: receiving, by a computing device, input data for classification; mapping, by a representation learner of the neural network, the input data to a plurality of feature vectors; applying a kernelized classification layer of the neural network to perform a nonlinear classification of the plurality of feature vectors into one or more classes, the neural network having been trained to select a kernel for the kernelized classification layer from a space of positive definite kernels based on application of a nonlinear softmax loss function to training data; and predicting one or more labels for the input data based on the one or more classes.

In an eighth aspect, a system is provided. The system includes means for receiving, by a computing device, input data for classification; means for mapping, by a representation learner of the neural network, the input data to a plurality of feature vectors; means for applying a kernelized classification layer of the neural network to perform a nonlinear classification of the plurality of feature vectors into one or more classes, the neural network having been trained to select a kernel for the kernelized classification layer from a space of positive definite kernels based on application of a nonlinear softmax loss function to training data; and means for predicting one or more labels for the input data based on the one or more classes.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 2 is a table illustrating example accuracy results on a test dataset, in accordance with example embodiments.

FIGS. 3A-B are tables illustrating example results for image datasets, in accordance with example embodiments.

FIG. 4 is a table illustrating example results for transfer learning datasets, in accordance with example embodiments.

FIG. 5 is a table illustrating example results in a distillation setting, in accordance with example embodiments.

FIG. 6 is a table illustrating example results for active learning, in accordance with example embodiments.

FIG. 7 is a table illustrating example accuracy for normalization of features and weights, in accordance with example embodiments.

FIG. 8 is a table illustrating example effects of rectification of feature vectors, in accordance with example embodiments.

FIG. 9 is a table illustrating example accuracy values for activation functions, in accordance with example embodiments.

FIG. 14 is a flowchart of a method, in accordance with example embodiments.

FIG. 15 is another flowchart of a method, in accordance with example embodiments.

DETAILED DESCRIPTION

Figure 1:
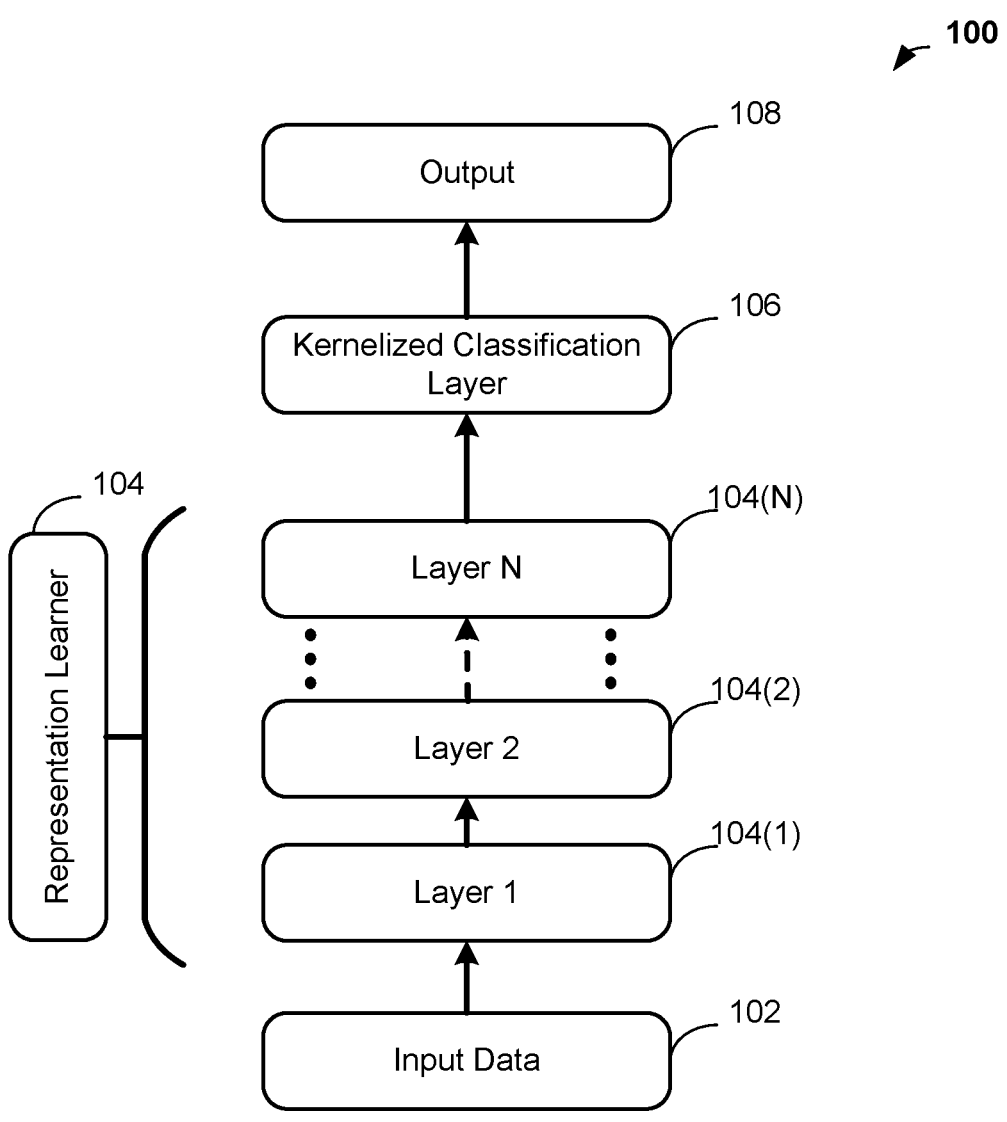
FIG. 1 is a diagram illustrating an example neural network comprising a representation layer and a kernelized classification layer, in accordance with example embodiments.

This application relates, in one aspect, to a kernelized classifier based neural network. In another aspect, this application relates to applying neural network techniques, to classify input data. In yet another aspect, this application relates to introducing a nonlinear classifier during training of a neural network.

Overview and Introduction

Deep learning is generally built upon a premise that useful representations of the inputs may be automatically learned from data. For example, in an image classification setting, a representation learning network consisting of building blocks such as convolution and max-pooling is used to obtain a vector representation of the input image. Such a vector representation may be referred to as the feature vector of an input image. The input image may be then classified into an appropriate class within a last layer of a network, for example, a fully-connected layer operating on the feature vector. This last classification layer represents a linear classifier in the space of learned feature vectors. Therefore, to perform well on the classification task, the classes have to be linearly separable in the space of feature vectors. While this is a standard assumption in many tasks, it is conceivable that using a nonlinear classifier on the learned feature vectors may provide additional benefits, especially when a feature extractor, that generates the feature vector, does not have enough capacity to learn fully linearly separable features.

Kernel methods is another branch of machine learning, and may be associated with a Support Vector Machines (SVM) algorithm. In general, kernel methods have been used for learning with hand-crafted feature vectors, such as, for example, histogram-of-oriented-gradients (HOG), and bag-of-visual-words, for image classification. In kernel methods, instead of running a linear classifier on the feature vectors, the feature vectors may be first mapped to a higher-dimensional Reproducing Kernel Hilbert Space (RKHS) using a positive definite kernel function. A linear classifier may be run on this high-dimensional RKHS. Since the dimensionality of the feature vectors may be significantly increased via this mapping, a linear classifier in the RKHS may be considered to correspond to a powerful non-linear classifier in the original space of feature vectors. This technique may be referred to as a "kernel trick". Explicit calculation of high-dimensional vectors in the RKHS may be computationally expensive to compute and store. The kernel trick does not require an explicit calculation of the high-dimensional vectors in the RKHS.

Although kernel methods can yield desirable results in some machine learning models, the choice of the kernel function can be challenging. In some instances, a collection of well-known kernels, such as a linear kernel, a polynomial kernel, and a Gaussian RBF kernel, may be utilized. In some instances, a Gaussian RBF kernel can be a common choice; however, tuning its bandwidth parameter can be non-trivial, and different values for this parameter can lead to vastly different results. Furthermore, the Gaussian RBF kernel is only one member of a family of positive definite kernels. Accordingly, another positive definite kernel may be a better fit for a given problem.

As described herein, automatic representation learning and nonlinear kernel-based classification techniques may be brought together in a novel manner. To this end, a nonlinear, kernelized classification layer may be utilized in deep neural networks. Also, as described herein, an appropriate positive-definite kernel for a given task may be automatically determined as an optimal kernel over a class of positive definite kernels. In particular, a kernel learning method that learns the optimal kernel from the data within a deep learning framework is described. In some embodiments, the full network may include a conventional representation learner and a kernelized classification layer powered with automatic kernel learning. Such a full network can be trained end-to-end using a backpropagation algorithm.

Also, for example, applications are described, including finding compact student networks with knowledge distillation, and training accurate models with less data. Also, for examples, applications to image classification, transfer learning, distillation, and active learning settings, are described on a number of datasets.

Some neural networks utilize kernel methods, such as a sigmoid kernel used in conjunction with SVMs. This kernel is based on a sigmoid activation used in early generations of neural networks. Also, for example, kernel functions that mimic the computation in multilayer neural nets are also sometimes used in neural networks. In some instances, a linear convolution used in convolutional neural networks (CNNs) can be extended to a nonlinear operation. For example, convolutional kernel networks may provide a kernel approximation scheme to interpret convolutions. As another example, series approximations may be utilized to extend convolutions to a nonlinear operation by introducing quadratic terms. Also, for example, a kernelized version of a convolution operation may be utilized that can learn more complex features than a usual convolution operation can.

However, some kernels used in these types of known models, such as $L^p$-norm kernels, are not positive definite, and therefore do not represent a valid RKHS mapping. Neural networks described herein, however, are based on positive definite kernels, which represent valid mappings to an RKHS. Also, for example, learning of hyperparameters of predefined kernels in the known models are different from the kernel learning method presented herein. For example, methods described herein determine an optimal kernel over a space of all radial positive definite kernels on a unit sphere, instead of limiting optimization to hyperparameters of predefined kernels.

Although an RBF kernel layer may be used in some known models to produce a feature space from point cloud input, the RBF kernel layer as described herein is used on input data and not in the classification layer.

Loss functions, other than a softmax cross entropy loss in CNN settings, are also sometimes used in the open-set classification setting. For example, a Center Loss may be used, that encourages low intra-class variance in feature vectors. Other loss functions may achieve acceptable performance by leaving additional margins in the softmax loss. However, the loss functions described herein are applied in a closed-set classification setting, and employ an automatically learned kernel to obtain nonlinear classification boundaries.

Some neural network models utilize second order pooling methods in nonlinear classification in a feature vector space. Generally, using a second order pooling is known to be equivalent to using a second-degree polynomial kernel function. Some known methods extend second-order pooling to higher orders while learning the coefficients of higher order interactions. Such methods require explicit determinations of feature maps using Fast Fourier Transforms (FFTs). However, techniques described herein do not need an explicit determination of feature maps, and the neural network learns the kernel over a space of all possible positive definite kernels on a hyper-sphere, which includes polynomial kernels.

Selection of an appropriate kernel may be performed using methods such as a Multiple Kernel Learning (MKL) approach. However, such known methods do not scale well with a size of the training dataset. As described herein, the kernel may be learned automatically within a deep network, thereby enabling automatic representation learning, also scaling well for large training sets.

Network Architecture a. Nonlinear Softmax Loss

A multi-class classification problem may be considered with a training set $\{(x_i, y_i)\}_{i=1}^N$, where $x_i \in X$ for each i, $y_i \in [L] = \{1, 2, \ldots, L\}$ for each i, X is a nonempty set, L is a number of labels, and N is a number of training examples. For example, each training data point $(x_i, y_i)$ can be an image with its class label.

A deep neural network (DNN) may be configured to solve the multi-class classification problem. The DNN may include two components: a representation learner (also called a feature learner) and a classifier. In the case of image classification, the representation learner can consist of one or more components, including, but not limited to, convolution layers, max-pooling layers, and fully-connected layers. In some embodiments, a kernelized classification layer may be a fully connected layer of a neural network. The classifier is the last fully-connected layer operating on the feature vectors, which may be endowed with a loss function during training.

FIG. 1 is a diagram illustrating an example neural network 100 comprising a representation layer 104 and a kernelized classification layer 106, in accordance with example embodiments. During a training phase of neural network 100, input data 102 (e.g., training data) can be received. Representation layer 104, comprising one or more layers (e.g., Layer 1 104(1), Layer 2 104(2), . . . , Layer N 104(N)), can determine a plurality of feature representations of input data 102. In some instances, the feature representations may not be linearly separable. In such instances, the plurality of feature representations can be embedded in an appropriate higher dimensional space so as to enable linear separability. In some embodiments, such an appropriate higher dimensional space may be a learnable aspect of neural network 100.

In some embodiments, representation learner 104 includes one or more of a convolution layer, a max-pooling layer, or a fully connected layer. For example, Layer 1 104(1) can correspond to a first convolution layer, Layer 2 104(2) can correspond to a first a max-pooling layer, and so forth. Likewise, Layer N 104(N) may correspond to a fully connected layer.

Let $r^\theta: X \to \mathbb{R}^d$ denote a representation learner, where d is a dimensionality of the learned feature vectors, and $\theta$ represents all the (learnable) parameters in this part of the neural network 100. The classifier may be characterized by a function $g^{(\Omega)}: \mathbb{R}^d \to [L]$, where $\Omega$ denotes all the parameters in the last layer of the network. In some embodiments, $\Omega$ may include weight vectors $w_1$, $w_2$, ..., $w_L$ with each $w_j$ $\in \mathbb{R}^d$, and bias terms $b_1$, $b_2$, ..., $b_L$ with each $b_j \in \mathbb{R}^d$. The function $g^{(\Omega)}$ may take the form:

$$g^{(\Omega)}(f) = \underset{j}{\arg\max}\, w_j^T f \qquad \text{(Eqn. 1)}$$

where $f = r^\theta(x) \in \mathbb{R}^d$ is a feature vector for input x. For illustrative purposes, additive bias terms $b_j$ may be removed to keep the notation uncluttered. There is no loss of generality since the bias term can be absorbed into $w_j$ by appending a constant element to f. During inference, the deep network's class prediction $\hat{y}^*$ for an input $x^*$ can be configured as a composite of the above functions as:

$$\hat{y}^* = (g^{(\Omega)} o\; r^\theta)(x^*) \qquad \text{(Eqn. 2)}$$

In some embodiments, a training of neural network 100 to learn the kernel, and a training of neural network 100 to learn the one or more representation parameters, can be performed jointly. Although conceptually there are two components the deep network, their parameters $\theta$ and $\Omega$ may be learned jointly during the training of neural network 100. One way of training a classification network is by minimizing the softmax loss applied to the classification layer. The softmax loss is a combination of a softmax function and a cross-entropy loss. More specifically, for a single training example (x, y) with the feature vector $f = r^\theta(x)$, the softmax loss can be determined as:

$$l(y, f) = -\log\left(\frac{\exp\left(w_y^T f\right)}{\sum_{j=1}^{L}\exp\left(w_j^T f\right)}\right) \qquad \text{(Eqn. 3)}$$

Note that it may be inferred from Eqn. 1 that the classifier $g^{(\Omega)}$ trained in this manner is completely linear in $\mathbb{R}^d$, the space of the feature vectors f.

In some embodiments, nonlinear classifiers on $\mathbb{R}^d$ may be obtained using the kernel trick. This may be achieved by first embedding feature vectors f into a high-dimensional Reproducing Kernel Hilbert Space (RKHS) $\mathcal{H}$ and performing the classification in $\mathcal{H}$. Although the classification is linear in $\mathcal{H}$, it may be non-linear in the original feature vector space $\mathbb{R}^d$. Accordingly, let $\phi: \mathbb{R}^d \rightarrow \mathcal{H}$ represent such a RKHS embedding. Performing classification in $\mathcal{H}$ is then equivalent to training neural network 100 with the following modified version of the softmax loss:

$$l'(y, f) = -\log\left(\frac{\exp(\langle\phi(w_y), \phi(f)\rangle_{\mathcal{H}})}{\sum_{j=1}^{L}\exp(\langle\phi(w_j), \phi(f)\rangle_{\mathcal{H}})}\right) \qquad \text{(Eqn. 4)}$$

where $\langle,\rangle_{\mathcal{H}}$ denotes the inner product in the Hilbert space $\mathcal{H}$. The key difference between Eqn. 3 and Eqn. 4 is that the dot products between $w_j$ and f have been replaced with the inner products between $\phi(w_y)$ and $\phi(f)$. Accordingly, a more general notion of an inner product may be utilized, instead of the dot product, because the Hilbert space $\mathcal{H}$ may, in some embodiments, be infinite dimensional.

In some embodiments, kernelized classification layer 106 may apply a class label predictor function to the plurality of feature representations. For a network trained with this nonlinear softmax function, predictions may be obtained using a modified version of a predictor configured as:

$$g'^{(\Omega)}(f) = \underset{j}{\arg\max}\langle\phi(w_j), \phi(f)\rangle_{\mathcal{H}} \qquad \text{(Eqn. 5)}$$

As described, Hilbert space embeddings $\phi(.)$ may be very high dimensional, and, in some embodiments, infinite dimensional. Therefore, computing and storing the embeddings may be computationally complex and/or expensive. However, the kernel trick may be utilized to overcome this problem. In particular, an explicit computation of $\phi(.)$ may be avoided by directly evaluating the inner product using a kernel function k: $\mathbb{R}^d \times \mathbb{R}^d \rightarrow \mathbb{R}$. That is:

$$\langle\phi(w),\phi(f)\rangle_{\mathcal{H}} = k(w,f) \qquad \text{(Eqn. 6)}$$

However, for a kernel function to represent a valid RKHS, it must be positive definite. As described below, such positive definiteness may also be achieved via suitable truncation techniques.

b. Kernels on a Unit Sphere

As described herein, given a kernel function on a feature vector space, a nonlinear classifier in the last layer of a deep network may be configured by modifying the softmax loss function during training, and the predictor during inference. Generally, there may be various choices for kernel functions such as a polynomial kernel, a Gaussian RBF kernel (e.g., squared exponential kernel), and a Laplacian kernel. However, such kernels are pre-determined for a particular machine learning model. Also, for example, such kernels may include hyperparameters that need to be manually tuned. Although, in some example instances such as multiple kernel learning (MKL) frameworks, an optimal kernel may be learned as a linear combination of some predefined kernels, such methods do not scale well with the size of the training dataset. Accordingly, pre-determined kernels, and/or kernels used in MKL frameworks may not be a desirable kernel for a particular neural network, and it may therefore be desirable for a neural network to select an optimal kernel from a collection of kernels.

In some embodiments, a kernel associated with kernelized classification layer 106 may be learned during the training phase. In some instances, the kernel may be learned based on the modified version of a softmax loss function, as described in Eqn. 4. In some embodiments, the softmax loss function may be a combination of a softmax function and a cross-entropy loss.

By formulating kernel learning as a neural network layer, desirable properties of deep learning, including scalability and automatic feature learning, may be preserved. Also, for example, the method described herein may scan an entire space of positive definite kernels applicable to a specific problem setting to find an optimal kernel.

As used herein, positive definite kernels may be defined as follows: for a non-empty set $\mathcal{U}$, a function k: $\mathcal{U} \times \mathcal{U} \rightarrow \mathbb{R}$ is a positive definite kernel, if k(u,v)=k(v,u) for all u,v∈ $\mathcal{U}$, and $$\sum_{j=1}^{N}\sum_{i=1}^{N} c_i c_j k(u_i, u_j) \geq 0 \qquad \text{(Eqn. 7)}$$

for all N∈ $\mathbb{N}$, $\{u_1, u_2, \ldots, u_N\} \subseteq \mathcal{U}$, and $\{c_1, c_2, \ldots, c_N\} \subseteq \mathbb{R}$.

It is known that the family of all positive definite kernels on a given nonempty set forms a convex cone that is closed under pointwise multiplication and pointwise convergence. In this description, to simplify the problem setting, it may be assumed that both the feature vectors f and the weight vectors $w_j$ are $L^2$-normalized. The term $L^2$-normalization generally means that dataset values may be modified so that for each row of a dataset, the sum of squares of the entries add up to 1. Such a normalization may simplify computations, and may also serve to stabilize training of a neural network. Accordingly, in what follows, positive definite kernels on the unit sphere in $\mathbb{R}^d$ may be considered. The unit sphere may be denoted as $S^n$, where n=d=1.

Also, for example, the collection of kernels may be taken to comprise radial kernels on $S^n$. The term "radial kernels" generally refers to kernels that only depend on a distance between two input points, and are translation invariant. The collection of radial kernels includes kernels on $S^n$ that are commonly used, such as the linear kernel, the polynomial kernel, the Gaussian RBF kernel, and the Laplacian kernel, and so forth. It can be shown that a radial kernel k: $S^n \times S^n \rightarrow \mathbb{R}$ is positive definite for any n if and only if it admits a unique series representation of the form:

$$k(u, v) = \sum_{m=0}^{\infty} \alpha_m \langle u, v \rangle^m + \alpha_{-1}(\llbracket \langle u, v \rangle = 1 \rrbracket - \llbracket \langle u, v \rangle = -1 \rrbracket)$$

$$+ \alpha_{-2} \llbracket \langle u,v \rangle \in \{-1,1\} \rrbracket \qquad \text{(Eqn. 8)}$$

Such a complete characterization of positive definite radial kernels on $S^n$ enables automatic learning of an optimal kernel classifier within a deep network, as described herein.

c. Kernelized Classification Layer

In some embodiments, a kernelized classification layer may be configured as a replacement for a softmax classification layer in a deep network. This kernelized classification layer may classify feature vectors in a high-dimensional RKHS while automatically choosing an optimal positive definite kernel that enables a mapping into the RKHS. Accordingly, a need for predefined kernels, and/or a manual tuning of hyperparameters for such kernels, may be eliminated. For example, the computing device may receive particular input data for classification. Then, the computing device may obtain a first neural network with the representation learner and a softmax classification layer. Then, the computing device may substitute the softmax classification layer with a particular kernelized classification layer to convert the first neural network to a particular neural network. Subsequently, the computing device may train the particular neural network to learn a particular kernel for the particular kernelized classification layer. Then, the computing device may apply the particular kernelized classification layer of the particular neural network to predict a particular label for the particular input data. In some embodiments, the particular kernelized classification layer may be pre-trained. For example, the particular kernelized classification layer may be pre-trained based on a type of classification problem. Accordingly, upon the substitution of the softmax classification layer with the particular kernelized classification layer, the particular neural network may not need to be trained, and may be able to predict the particular label for the particular input data.

i. Mechanics of the Kernelized Classification Layer

In some embodiments, kernelized classification layer 106 separates the plurality of feature representations into one or more classes, with neural network 100 having been trained to learn a kernel for kernelized classification layer 106. Kernelized classification layer 106 may be parameterized by weight vectors $w_1, w_2, \ldots, w_L$, and some additional learnable coefficients, $\alpha_{-2}, \alpha_{-1}, \ldots, \alpha_M$, where M∈ $\mathbb{N}$, and each $\alpha_m \geq 0$. During training, kernelized classification layer 106 maps feature vectors f to a high-dimensional RKHS $H_{opt}$, which optimally separates feature vectors belonging to different classes, and learns a linear classifier in $\mathcal{H}_{opt}$. During inference, kernelized classification layer 106 maps feature vectors of a previously unknown input to the RKHS it learned during training, and performs classification in the learned RKHS. This may be achieved by using a nonlinear softmax loss defined in Eqn. 4 during training, and a nonlinear predictor defined in Eqn. 5 during testing. Also, for example, the inner product in $\mathcal{H}$ may be configured as:

$$\langle \phi(w), \phi(f) \rangle_{\mathcal{H}} = \langle \phi(w), \phi(f) \rangle_{\mathcal{H}_{opt}} = k_{opt}(w,f) \qquad \text{(Eqn. 9)}$$

where $k_{opt}(. , .)$ is a reproducing kernel of $\mathcal{H}_{opt}$. An optimal RKHS $\mathcal{H}_{opt}$ for a given classification problem may be learned by determining an optimal kernel $k_{opt}$ during training, as discussed in the following.

As described herein, any positive definite radial kernel on $S^n$ admits the series representation shown in Eqn. 8. Therefore, an optimal kernel $k_{opt}$ may be represented by such a series. Also, for example, the series representation may be infinite, and may be approximated with a finite summation by truncation of terms. For example, terms beyond the order M may be truncated to obtain a finite representation as below:

$$k_{opt}(w, f) \approx \sum_{m=0}^{M} \alpha_m k_m(w, f) + \alpha_{-1} k_{odd}(w, f) + \alpha_{-2} k_{even}(w, f) \qquad \text{(Eqn. 10)}$$

$$k_{odd}(w, f) = \llbracket \langle u, v \rangle = 1 \rrbracket - \llbracket \langle u, v \rangle = -1 \rrbracket$$

$$k_{even}(w, f) = \llbracket \langle u, v \rangle \in \{-1, 1\} \rrbracket$$

where $k_m$: (u,v):$\rightarrow \langle u,v \rangle^m$ is a positive definite kernel on $S^n$ for each integer m≥0, and where $\alpha_{-2}, \alpha_{-1}, \ldots, \alpha_M \geq 0$. It may be demonstrated that $k_{opt}$ is positive definite.

In some embodiments, the training of neural network 100 to learn the kernel may include learning one or more kernel parameters. For example, representation learner 104 may be associated with one or more representation parameters learnable by neural network 100. For example, as defined in Eqn. 10, $k_{opt}$ may be learned automatically from data by making the coefficients $\alpha_{-2}, \alpha_{-1}, \ldots, \alpha_M$, learnable parameters of the classification layer. Accordingly, let $\alpha = [\alpha_{-2}, \alpha_{-1}, \ldots, \alpha_M]^T$.

In some embodiments, neural network 100 may learn the kernel by applying backpropagation and gradient descent methods. For example, a gradient of the modified version of the softmax loss function can be determined based on a backpropagation algorithm. Then, the training of the neural network to learn the kernel can be based on applying the gradient during a gradient descent based optimization of the neural network. The gradient of the loss function with respect to $\alpha$ can be calculated via the backpropagation algorithm using Eqns. 4, 9, and 10. Therefore, it can be optimized along with weight vectors $w_1, w_2, \ldots, w_L$ during the gradient descent based optimization of the network. This procedure is equivalent to automatically finding the RKHS that optimally separates the feature vectors belonging to different classes.

The constraint $\alpha_{-2}, \alpha_{-1}, \ldots, \alpha_M \geq 0$ in Eqn. 10 may be imposed using regularization of coefficients, as described herein. As for the number of kernels M in the approximation of the series representation in Eqn. 10, as long as M is chosen to be sufficiently large, there can be flexibility in a choice of M. This is because truncated higher order terms of the infinite series in Eqn. 8 approach either $k_{odd}$ or $k_{even}$, both of which are already included in the finite summation in Eqn. 10. On the other hand, if the terms beyond some order M'<M are not significant, the network can automatically learn to make the corresponding coefficients in a vanish. In some implementations, ten (10) kernels may work well enough, and ten kernels can be used in the experiments described herein.

Generally, kernelized classification layer 106 described herein can pass on the gradients of the loss to its inputs, such as the feature vectors f. Therefore, kernelized classification layer 106 can be compatible with end-to-end training, and can act as a drop-in replacement for a softmax classification layer in an existing neural network.

ii. Regularization of Coefficients

In some embodiments, the one or more kernel parameters may be regularized based on a rectified linear unit (ReLU) operation. A constraint such as $\alpha_{-2}, \alpha_{-1}, \ldots, \alpha_M \geq 0$, preserves positive definiteness of $k_{opt}$. Such a constraint may be imposed by using $\alpha = \text{ReLU}(\alpha')$, where $\alpha'$ is a learnable parameter vector. However, a ReLU operation may lack an upper-bound, and allowing a scale of $\alpha$ to grow in an unbounded manner may result in errors in optimization. For example, assume that there is an instantiation $\alpha_0$ of the vector $\alpha$. By replacing $\alpha_0$ with $\lambda \alpha_0$, where $\lambda > 1$, all the inner product terms in Eqns. 4 and 5 may be scaled by the same factor $\lambda$. As a result, the loss of neural network for correctly classified training examples may be improved, without making any effective change to a predictor. Therefore, under this setting, once a majority of the training examples are correctly classified, the neural network may easily improve the loss by increasing a norm of $\alpha$, by multiplying by a scaling factor $\lambda$, which may not be useful. Accordingly, to avoid such an unbounded growth of the scale of $\alpha$, an $L^2$-regularization on a may be applied when a ReLU activation is used.

Alternatively, $\alpha = \text{sigmoid}(\alpha')$ or $\alpha = \text{softmax}(\alpha')$ may be used, both of which guarantee the constraint $\alpha_{-2}, \alpha_{-1}, \ldots, \alpha_M \geq 0$, also result in a bounded growth of the scale of $\alpha$. Therefore, no regularization on a may need to be applied for these options for $\alpha$. It may be noted that a softmax activation used herein is not to be confused with the nonlinear softmax loss discussed previously. The usage of the softmax activation in this context is similar to that in the scientific literature on self-attention, where it is generally used to normalize the coefficients of a linear combination.

At run-time, neural network 100 may receive input data 102 and generate output data 108. For example, neural network 100 may predict a label for input data 102 based on the one or more classes generated by kernelized classification layer 106, as described herein. For example, during an inference phase of neural network 100, input data 102 can be received. Generally, input data 102 is not previously known to neural network 100. Representation layer 104 comprising one or more layers (e.g., Layer 1 104(1), Layer 2 104(2), . . . , Layer N 104(N)) can determine a plurality of feature representations of input data 102. In some embodiments, kernelized classification layer 106 may be a last fully connected layer (e.g., after one or more fully connected layers ending with Layer N 104(N)) of neural network 100. Kernelized classification layer 106 can map the feature representations of input data 102 to the higher dimensional space that was learned during the training phase, and perform classification of input data 102. For example, a nonlinear class label predictor function can be used to classify input data 102.

Example Applications and Evaluations

Kernelized classification methods described herein may be particularly useful in settings where the capacity of the feature learning and/or an underlying neural network is capacity limited. This is because a capacity-limited neural network may not be able to learn fully linearly separable features. Accordingly, a nonlinear classifier may be useful to augment capabilities of a capacity-limited neural network.

Another common method used to improve classification with capacity-limited networks is knowledge distillation, where the logit, or probability outputs, of a larger teacher network is used to train a smaller student network. While training the student network, the loss function (partially) may consist of the cross-entropy loss with the teacher network's output. More specifically, assume that for a training example (x,y), the teacher network produces logits $h = [h_1, h_1, \ldots, h_L]^T$. Then, for the student network with the feature vector $f = r^\theta(x)$, and a classification layer parameterized by weight vectors $w_1, w_2, \ldots, w_L$, the cross-entropy loss may be given by:

$$l_{st}(h, f) = - \sum_{j'=1}^{L} \tilde{h}_{j'} \log\left( \frac{\exp\left(w_{j'}^T f / T\right)}{\sum_{j=1}^{L} \exp\left(w_j^T f / T\right)} \right) \text{ where} \tag{Eqn. 11}$$

$$\tilde{h}_{j'} = \frac{\exp\left(\frac{h_{j'}}{T}\right)}{\sum_{j=1}^{L} \exp\left(\frac{h_j}{T}\right)} \tag{Eqn. 12}$$

where T is a temperature hyperparameter. In distillation, the student network attempts to imitate a teacher network which is capable of producing more powerful feature vectors than the student network. Intuitively, therefore, the student network could benefit from using a powerful nonlinear classifier on the weak feature vectors it generates. Accordingly, a kernelized classification layer may be utilized in the student network. The cross-entropy loss with the teacher scores in this case may be given as:

$$l'_{st}(h, f) = - \sum_{j'=1}^{L} \tilde{h}_{j'} \log\left( \frac{\exp(\langle \phi(w_{j'}), \phi(f) \rangle_{\mathcal{H}} / T)}{\sum_{j=1}^{L} \exp(\langle \phi(w_j), \phi(f) \rangle_{\mathcal{H}} / T)} \right) \tag{Eqn. 13}$$

where all the terms have the same meanings defined previously.

For experiments, the baseline may be the standard softmax classifier. In image classification, three additional baselines may be used, such as those based on a linear kernel, a second order pooling, and kervolutional networks.

For evaluation purposes, the classification layer may be replaced with a kernelized classification layer described herein. In the experiments, 10 kernels may be used, which indicates that the kernelized classification layer uses only 10 additional learnable parameters. As described herein, a ReLU activation may be used along with a weight decay of 0.0001 on the 10-dimensional parameter vector. In some instances, the weight decay may correspond to an amount of weight decay used in the other components of the neural network. Also, for example, the vector may be initialized with all ones.

To keep a number of learnable parameters comparable, an additive bias term may be maintained in the baseline classifier, and omitted from the kernelized classifier. This bias term introduces a number of learnable parameters equal to the number of classes used. Therefore, in many instances, the baseline model may utilize more learnable parameters than the kernelized classifier. Also, for example, the ReLU activation on the feature vectors may be removed to utilize a full surface of $S^n$. Similar modifications may be applied to the baseline model to enable a fair comparison.

Throughout the experiments, a stochastic gradient descent (SGD) may be used with 0.9 momentum, linear learning rate warmup, cosine learning rate decay, and the base learning may be performed by cross validation. When a better learning rate schedule is available for the baseline, that may be used in the experiments to compare accuracy of classification. In some embodiments, a maximum number of epochs may be 450 in all cases. Mini-batch size of 128 for the synthetic and CIFAR datasets may be used, and a batch size of 64 may be used for other datasets with larger images. In some embodiments, a CIFAR data augmentation method may be applied for CIFAR-10 and CIFAR-100 datasets, and an ImageNet data augmentation may be applied to other image datasets.

a. Synthetic Data

The kernelized classification layer may be evaluated as an isolated unit by demonstrating its capabilities to learn nonlinear patterns on $S^n$. In some instances, a two-class dataset on $S^2$ may be generated with a mixture of Gaussian clusters for each class. Also, for example, a visual representation of the training dataset, the baseline classifier's output, and the kernelized classifier's output may be generated on the unit sphere, $S^2$. In some examples, the training dataset may be a binary synthetic dataset, and the baseline classifier may be a softmax classifier. In general, because a softmax classifier is a linear classifier with respect to the feature vectors, it only separates cap-like regions on $S^2$. However, the kernelized classifier described herein can perform a more complex nonlinear separation of the data. For example, a kernelized classifier can separate regions on the unit sphere, in addition to cap-like regions (that can be separated by a softmax classifier). This is enabled, at least in part, due to higher dimensional embedding of the feature representation into a space, such as, for example, into the RKHS, that may be learned during training of the neural network. Generally, performing classification in RKHS is equivalent to training a neural network with a modified version of a softmax loss function.

The binary dataset used in the experiments may be generated using a mixture of Gaussians. More specifically, 10 cluster centers for each class may be generated by sampling from an isotropic Gaussian distribution with covariance $0.5 I_3$, and mean $[1, 0, 0]^T$ for the blue class, and $[0, 1, 0]^T$ for the orange class. Subsequently, 5,000 training observations may be generated for each class using a method as follows: for each observation, a cluster center of a corresponding class may be randomly selected (based on a uniform distribution), and then a sample from an isotropic Gaussian distribution centered at that cluster center may be generated with covariance $0.02 I_3$. All the observations can be projected on to $S^2$ by $L^2$-normalizing them. The test set can be generated in the same manner using the same cluster centers as the training set.

FIG. 2 is a table 200 illustrating example accuracy results on a test dataset, in accordance with example embodiments. In some embodiments, generated observations on $S^2$ may be taken to be feature vectors, and a baseline softmax classification layer and a kernelized classification layer may be trained on these observations for comparison. For example, based on the binary synthetics dataset previously described, an accuracy of the kernelized classifier is 94.20, as compared to an accuracy of a softmax classifier is 85.51. Also, for example, the accuracy of the kernelized classifier at 94.20 is close to an accuracy of 95.06 of a Bayes optimal classifier, which is generally accepted as a theoretical upper bound for an accuracy measurement. It may be noted that the accuracy of the kernelized classification layer significantly outperforms the baseline softmax classification layer and gets close to the Bayes optimal performance. This may be attributed to the layer's capabilities to learn nonlinear patterns on the sphere by embedding the data into an RKHS that optimally separates different classes.

b. Image Classification

In one aspect, the input data for classification comprises image data. Accuracy of classification performed by a kernelized classification layer is generally higher than that of a softmax classifier. Results on CIFAR-10 and CIFAR-100 real world image benchmarks may be analyzed. For each dataset, experiments may be performed on a plurality of CIFAR ResNet architecture. In some implementations, four different baselines may be analyzed: (1) a standard softmax loss SM), (2) normalized feature vectors and weights with only the linear kernel (LIN) along with a learnable coefficient, such as a weight vector, and (3) a second order pooling (SOP), which may be based on a second degree polynomial, and (4) kervolutional networks (KER) with the Gaussian RBF kernel.

FIGS. 3A-B display tables 300A and 300B respectively, illustrating example results for image datasets, in accordance with example embodiments. The results are based on CIFAR-10 (FIG. 3A) and CIFAR-100 (FIG. 3B) real world image benchmarks, and illustrate results for multiple CIFAR ResNet architectures. For example, the representation learner may be a ResNet network with one of 8, 14, 20, 32, 44, or 56 layers. In all cases, the kernelized classification layer method (with results shown in tables 300A and 300B under respective columns labeled "Ours") significantly outperforms the baselines SM, LIN, SOP, and KER. These results highlight the benefits of optimizing over the entire space of positive definite kernels, instead of linear methods or predefined kernels.

c. Transfer Learning

In some example embodiments, the neural network comprising the kernelized classification layer may be applied to a transfer learning task. The methods described herein may be evaluated in a transfer learning setting with a ResNet-50 network pre-trained on an ImageNet ILSVRC 2012 classification dataset, and fine-tuned on Oxford-IIIT Pet and Stanford Cars datasets. For each dataset, train/test splits provided by a standard TensorFlow Dataset implementation may be used.

FIG. 4 is a table 400 illustrating example results for transfer learning datasets, in accordance with example embodiments. Note that the KER baseline may not be viable in this setting as it involves changes to the backbone network. A ResNet-50 network may be utilized, that has been pre-trained on an ImageNet ILSVRC 2012 classification dataset. The test datasets may be taken as Oxford-IIIT Pets and Stanford Cars datasets. On both Oxford-IIIT Pet and Stanford Cars datasets, results for a kernelized classification layer (indicated in table 400 as "Ours"), show significant gains over the baseline layers. This may be intuitively understood since the feature vectors learned from the source task (ImageNet ILSVRC 2012 classification dataset) may not linearly separate the new classes in the target task (Oxford-IIIT Pet or Stanford Cars datasets). Therefore, a nonlinear classifier may be advantageous in a transfer learning setting. As illustrated, accuracy of the kernelized classification layer is higher for both datasets, as compared to a softmax classifier. The training dataset, ImageNet ILSVRC 2012, and the test datasets, Oxford-IIIT Pets and Stanford Cars, comprising image data are used for illustrative purposes only. Generally, the neural network comprising the kernelized classification layer may be applied to a transfer learning task with non-image data as well.

d. Knowledge Distillation

In some example embodiments, the neural network comprising the kernelized classification layer may be applied to a knowledge distillation task. The method comprising the kernelized classification layer may be evaluated in the distillation setting. For example, CIFAR-10 and CIFAR-100 datasets may be used, with the softmax CIFAR ResNet-56 models from tables 300A and 300B of FIGS. 3A and 3B respectively as the teacher models, and a LeNet-5 network may be used as the student model. A cross-entropy loss may be used with the teacher scores with the temperature parameter T set to 20 in all cases.

FIG. 5 is a table 500 illustrating example results in a knowledge distillation setting, in accordance with example embodiments. The results are based on a CIFAR-10 and CIFAR-100 datasets, with a ResNet-56 model. As illustrated, accuracy of the kernelized classification layer is higher for both datasets, as compared to a softmax classifier. As indicated in table 600 of FIG. 5, significant gains may be observed with the kernelized classification layer (with results indicated in the column labeled "Ours"). This may be heuristically attributed to capabilities of the kernelized classification layer to approximate complex teacher probabilities even with weak feature vectors. The training dataset comprising image data is used for illustrative purposes only. Generally, the neural network comprising the kernelized classification layer may be applied to a knowledge distillation task with non-image data as well.

e. Active Learning

Active learning generally refers to reducing human annotation costs by selecting a subset of images to label that are more likely to yield a desired optimal model. One or more sampling methods may be used, such as, for example, random, margin, and k-center, to generate subsets of various sizes. The sampling methods rely on initial seed labels, prediction scores, and distances between the image embeddings, as described in detail below.

FIG. 6 is a table 600 illustrating example results for active learning, in accordance with example embodiments. Terms "rnd", "mgn", and "k-ctr", refer to random, margin, and k-center, respectively. As shown in FIG. 6, results on random subsets outperform the softmax ResNet56 models on margin and k-center based subsets, and better results are achieved using improved sampling methods.

The experimental setting used to evaluate active learning may be configured in several ways. The goal of this experiment is to show that the kernelized classification layer described herein can produce accurate models even with less data. In order to study this, subsets of datasets under various budgets may be generated using several sampling techniques, and the models trained on this may be evaluated for accuracy. One example dataset is based on random sampling, where images may be selected randomly under a given budget. Other methods may include margin, and k-center, where class prediction scores and features/embeddings from the images may be used in the subset selection.

Subset selection may be performed without actual labels of the images in the dataset, since active learning is driven toward reducing label annotation costs. In one evaluation, a 10% random subset of the original CIFAR-100 dataset with labels to initially learn an initial seed model may be used, which can subsequently be used to generate predictions and embeddings. Note that only embeddings and class prediction scores from this initial seed model may be used in the subset selection aspect, and original class labels of the images are not accessed. Also, for example, a batch setting can be used where the model is not incrementally updated after selecting every image. Entire subsets under a given budget may be selected. The CIFAR ResNet-56 model may be used for experimental purposes. The learning rate, batch size, and a number of epochs may be as described herein. For example, a stochastic gradient descent (SGD) may be used with 0.9 momentum, linear learning rate warmup, cosine learning rate decay, and the base learning may be performed by cross validation. In some embodiments, a maximum number of epochs may be 450. Mini-batch size of 128 may be used for the CIFAR datasets. The embedding features may be of dimension 64. For the k-center method, cosine distances between the embeddings may be used, where the cosine distances may be computed using a fast similarity search.

Although some of the examples set forth herein relate to image classification, non-image related applications are within the scope of this disclosure. Generally, problems that are amenable to multiclass classification methods, such as, for example, multinomial logistic regression techniques, can benefit from the kernelized classification layer described herein.

These and other example applications are contemplated within a scope of this disclosure.

Ablation Studies

For all the ablation experiments below, the CIFAR-100 dataset and the ResNet-56 backbone network may be utilized.

a. Kernel Learning

As described herein, methods based on automatic kernel learning have several advantages compared to methods based on a predefined kernel in the kernelized classification layer. To this end, the kernel learning method described herein may be compared to two predefined kernels in the kernelized classification layer, for example, the polynomial kernel of order 10, and the Gaussian RBF kernel.

FIG. 7 is a table 700 illustrating example benefits of learning the best kernel, in accordance with example embodiments. As indicated, automatically learning the kernel yields an accuracy of 74.10, which is a substantial improvement over the accuracy for the Gaussian RBF kernel (73.21), and the polynomial kernel (73.16). This is not surprising since the search space of the learned kernel contains both Gaussian RBF and polynomial kernels. This shows that optimizing over all possible positive definite kernels to find a desirable optimal kernel for a given problem can result in significant practical benefits.

b. Feature Rectification

As discussed previously, unlike the usual image classification networks, the ReLU activation may be removed from the feature vectors. This enables utilization of a full surface of $S''$ without being restricted to only the nonnegative orthant of $S''$.

FIG. 8 is a table 800 illustrating example effects of rectification of feature vectors, in accordance with example embodiments. As illustrated, the kernelized classifier performs better with unrectified features (with an accuracy of 74.10) than with rectified features (with an accuracy of 71.61). Also, in both instances, the kernelized classifier outperforms the softmax classifier. For example, for rectified classifiers, the softmax classifier has an accuracy of 70.96 as compared to the kernelized classifier with an accuracy of 71.61. Also, for example, for unrectified classifiers, the softmax classifier has an accuracy of 71.23 as compared to the kernelized classifier with an accuracy of 74.10. Accordingly, removing the ReLU operation has only a marginal effect on the standard softmax baseline classifier. However, removal of the ReLU operation has a significant impact on the kernelized classifier.

c. Activation on Kernel Coefficients

There may be several ways that a non-negative constraint $(\alpha_{-2}, \alpha_{-1}, \ldots, \alpha_M \geq 0)$ may be applied to the kernel coefficients $\alpha_m$. For example, ReLU, sigmoid, and softmax activations applied on $\alpha'$ may be evaluated.

FIG. 9 is a table 900 illustrating example accuracy values for activation functions, in accordance with example embodiments. As indicated, a higher performance (accuracy of 74.96) may be achieved when the kernelized classifier is used with a sigmoid activation function. Also, for example, experiments indicate that the kernelized classifier may perform better with some form of an activation function, as opposed to an absence of any activation functions.

Due to regularization of coefficients, a weight decay of 0.0001 may be used on the coefficient vector whenever ReLU activation is used. Although sigmoid and softmax activations eliminate the need for weight decay, they may impose a hard constraint on $|\langle \phi(w), \phi(f) \rangle_{\mathcal{H}}|$. To overcome this limitation, it may be helpful to use a temperature hyperparameter, T, in Eqn. 4, where each inner product may be divided by T before taking the exponential. We used a temperature of 0.1 and 0.005, with sigmoid and softmax activation functions, respectively. Although the sigmoid activation function gives the best performance, as illustrated in table 800 of FIG. 8, there may be optimization issues associated with it, which could be due to a vanishing gradient issue associated with this activation function. Therefore, the ReLU activation function may be used. However competitive results can be obtained with the softmax activation function, when used with a temperature of 0.005. Note that the kernelized classifier may, in some example implementations, be unstable when no activation function is used.

Technical Improvements

A full network is described, consisting of a conventional representation learner and a kernel classification layer described herein.

An end-to-end training of the full network is described using backpropagation and gradient descent methods.

Determination of an optimal higher dimensional embedding space for a space of feature vectors is described.

A nonlinear classification layer for a given classification problem is introduced. The classification layer can be, for example, a replacement for a fully connected layer in a neural network.

A modified version of a softmax loss function is introduced, and the nonlinear classification layer is based on this modified version of the softmax loss function.

A modified version of a class label predictor is described.

During training, a higher dimensional embedding space and a linear classifier in this higher dimensional space can be learned. However, as described herein, the classifier is nonlinear in the initial feature vector space.

During inference, feature vectors can be embedded in the higher dimensional embedding space that was learned, and the linear classifier that was learned can be applied to classify the feature vectors.

Determination of an optimal kernel mapping for a given classification problem is described. The kernel mapping allows for application of the nonlinear classification algorithm directly in a space of feature vectors. The kernel mapping can be obtained as a linear combination of constituent kernel functions, and coefficients of the linear combination are learnable.

The kernelized classification layer as described herein, can pass on gradients of a loss to input feature vectors. Thus, the kernelized classification layer is fully compatible with end-to-end training and can act as a drop-in replacement for an existing softmax classification layer.

Generally, a capacity-limited network (e.g., with limited capacity for feature learning, and/or limited capacity for a backbone network, and so forth) may not be able to learn fully linearly separable features of input data. Accordingly, a nonlinear classifier, such as the kernelized classification layer, can be useful to augment capabilities of the capacity-limited network.

The kernelized classification layer as described herein can be used as an isolated unit of a neural network.

An accuracy of the kernelized classification layer at 94.20, as measured by testing on a synthetic binary dataset, is close to an accuracy of 95.06 of a Bayes optimal classifier, which is generally accepted as a theoretical upper bound for an accuracy measurement.

A neural network with a kernelized classification layer, as described herein, is scalable with a size of a training dataset, since the kernel is learned within a deep network.

An end-to-end training of a neural network with a kernelized classification layer, as described herein, reduces a memory footprint of the neural network. This is particularly useful to applications that involve on-device recognition and/or classification of input data.

In the context of image classification using existing networks, such as a ResNet network, a ReLU activation is generally applied to feature vectors. Techniques disclosed herein may be performed by removing the ReLU activation.

Training Machine Learning Models for Generating Inferences/Predictions

Figure 10:
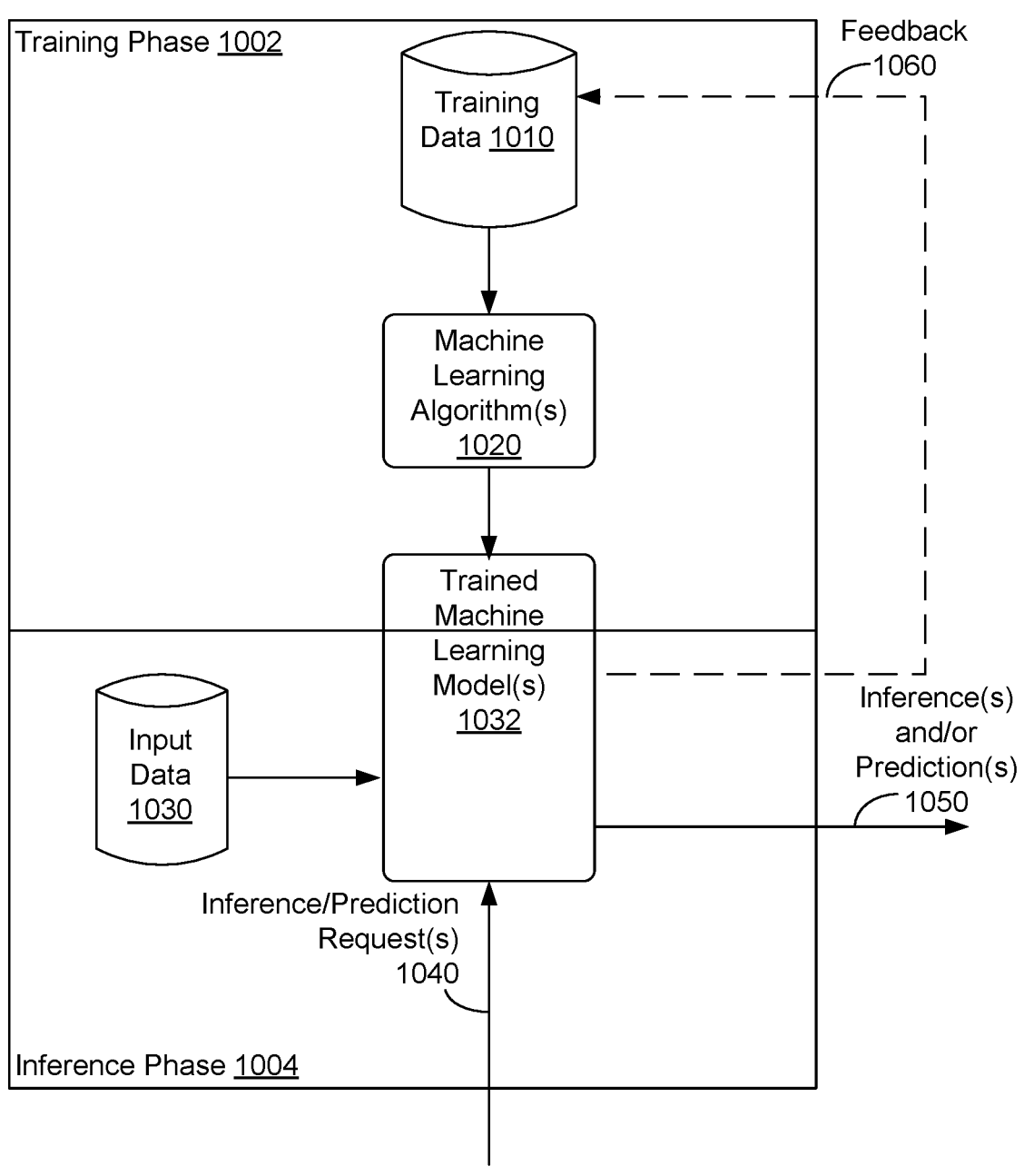
FIG. 10 is a diagram illustrating training and inference phases of a machine learning model, in accordance with example embodiments.

FIG. 10 shows diagram 1000 illustrating a training phase 1002 and an inference phase 1004 of trained machine learning model(s) 1032, in accordance with example embodiments. Some machine learning techniques involve training one or more machine learning algorithms, on an input set of training data to recognize patterns in the training data and provide output inferences and/or predictions about (patterns in the) training data. The resulting trained machine learning algorithm can be termed as a trained machine learning model. For example, FIG. 10 shows training phase 1002 where one or more machine learning algorithms 1020 are being trained on training data 1010 to become trained machine learning model(s) 1032. Then, during inference phase 1004, trained machine learning model(s) 1032 can receive input data 1030 and one or more inference/prediction requests 1040 (perhaps as part of input data 1030) and responsively provide as an output one or more inferences and/or prediction(s) 1050.

As such, trained machine learning model(s) 1032 can include one or more models of one or more machine learning algorithms 1020. Machine learning algorithm(s) 1020 may include, but are not limited to: an artificial neural network (e.g., a herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 1020 may be supervised or unsupervised, and may implement any suitable combination of online and offline learning.

In some examples, machine learning algorithm(s) 1020 and/or trained machine learning model(s) 1032 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 1020 and/or trained machine learning model(s) 1032. In some examples, trained machine learning model(s) 1032 can be trained, reside and execute to provide inferences on a particular computing device, and/or otherwise can make inferences for the particular computing device.

During training phase 1002, machine learning algorithm(s) 1020 can be trained by providing at least training data 1010 as training input using unsupervised, supervised, semi-supervised, and/or reinforcement learning techniques. Unsupervised learning involves providing a portion (or all) of training data 1010 to machine learning algorithm(s) 1020 and machine learning algorithm(s) 1020 determining one or more output inferences based on the provided portion (or all) of training data 1010. Supervised learning involves providing a portion of training data 1010 to machine learning algorithm(s) 1020, with machine learning algorithm(s) 1020 determining one or more output inferences based on the provided portion of training data 1010, and the output inference(s) are either accepted or corrected based on correct results associated with training data 1010. In some examples, supervised learning of machine learning algorithm(s) 1020 can be governed by a set of rules and/or a set of labels for the training input, and the set of rules and/or set of labels may be used to correct inferences of machine learning algorithm(s) 1020.

Semi-supervised learning involves having correct results for part, but not all, of training data 1010. During semi-supervised learning, supervised learning is used for a portion of training data 1010 having correct results, and unsupervised learning is used for a portion of training data 1010 not having correct results. Reinforcement learning involves machine learning algorithm(s) 1020 receiving a reward signal regarding a prior inference, where the reward signal can be a numerical value. During reinforcement learning, machine learning algorithm(s) 1020 can output an inference and receive a reward signal in response, where machine learning algorithm(s) 1020 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 1020 and/or trained machine learning model(s) 1032 can be trained using other machine learning techniques, including but not limited to, incremental learning and curriculum learning.

In some examples, machine learning algorithm(s) 1020 and/or trained machine learning model(s) 1032 can use transfer learning techniques. For example, transfer learning techniques can involve trained machine learning model(s) 1032 being pre-trained on one set of data and additionally trained using training data 1010. More particularly, machine learning algorithm(s) 1020 can be pre-trained on data from one or more computing devices and a resulting trained machine learning model provided to a particular computing device, where the particular computing device is intended to execute the trained machine learning model during inference phase 1004. Then, during training phase 1002, the pre-trained machine learning model can be additionally trained using training data 1010, where training data 1010 can be derived from kernel and non-kernel data of the particular computing device. This further training of the machine learning algorithm(s) 1020 and/or the pre-trained machine learning model using training data 1010 of the particular computing device's data can be performed using either supervised or unsupervised learning. Once machine learning algorithm(s) 1020 and/or the pre-trained machine learning model has been trained on at least training data 1010, training phase 1002 can be completed. The trained resulting machine learning model can be utilized as at least one of trained machine learning model(s) 1032.

In particular, once training phase 1002 has been completed, trained machine learning model(s) 1032 can be provided to a computing device, if not already on the computing device. Inference phase 1004 can begin after trained machine learning model(s) 1032 are provided to the particular computing device.

During inference phase 404, trained machine learning model(s) 1032 can receive input data 1030 and generate and output one or more corresponding inferences and/or predictions 1050 about input data 1030. As such, input data 1030 can be used as an input to trained machine learning model(s) 1032 for providing corresponding inference(s) and/or prediction(s) 1050 to kernel components and non-kernel components. For example, trained machine learning model(s) 1032 can generate inference(s) and/or prediction(s) 1050 in response to one or more inference/prediction requests 1040. In some examples, trained machine learning model(s) 1032 can be executed by a portion of other software. For example, trained machine learning model(s) 1032 can be executed by an inference or prediction daemon to be readily available to provide inferences and/or predictions upon request. Input data 1030 can include data from the particular computing device executing trained machine learning model(s) 1032 and/or input data from one or more computing devices other than the particular computing device.

Inference(s) and/or prediction(s) 1050 can include output images, output intermediate images, numerical values, and/or other output data produced by trained machine learning model(s) 1032 operating on input data 1030 (and training data 1010). In some examples, trained machine learning model(s) 1032 can use output inference(s) and/or prediction(s) 1050 as input feedback 1060. Trained machine learning model(s) 1032 can also rely on past inferences as inputs for generating new inferences.

A neural network comprising a representation learner and a kernelized classification layer can be an example of machine learning algorithm(s) 1020. After training, the trained version of the neural network can be an example of trained machine learning model(s) 1032. In this approach, an example of the one or more inference/prediction request(s) 1040 can be a request to predict a class for input data and a corresponding example of inferences and/or prediction(s) 1050 can be predicted class label for the input data.

In some examples, one computing device can include the trained version of the kernelized classification layer based neural network, perhaps after training. Then, another computing device can receive a request to predict a class for input data (e.g., an image), and use the trained version of the neural network to generate the class for the input data.

In some examples, two or more computing devices can be used to provide output images; e.g., a first computing device can generate and send requests to classify input data to a second computing device. Then, the second computing device can use the trained version of the neural network, to generate the class, and respond to the requests from the first computing device for the output class. Then, upon reception of responses to the requests, the first computing device can provide the requested output class (e.g., using a user interface and/or a display, a printed copy, an electronic communication, etc.).

Example Data Network

Figure 11:
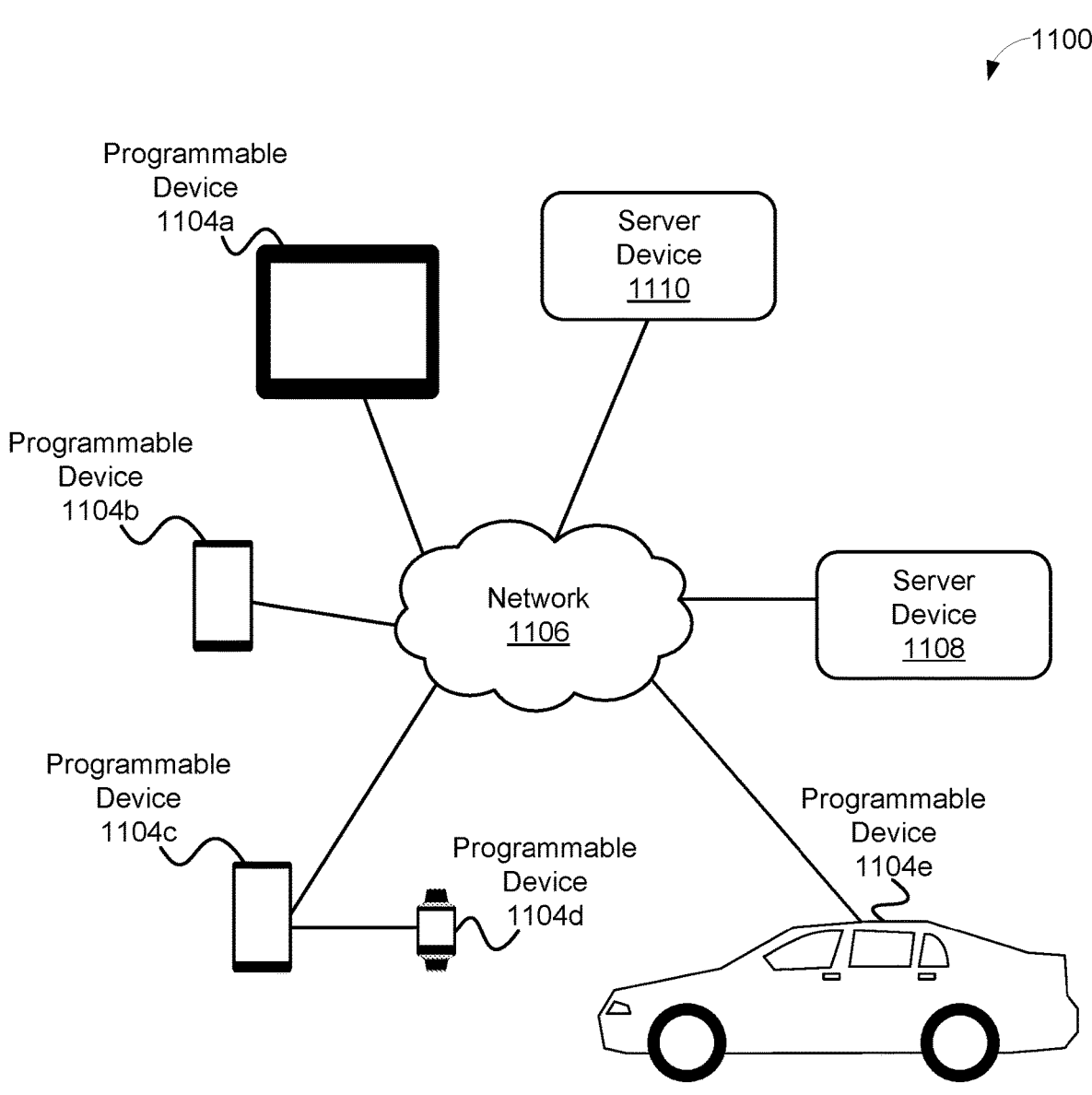
FIG. 11 depicts a distributed computing architecture, in accordance with example embodiments.

FIG. 11 depicts a distributed computing architecture 1100, in accordance with example embodiments. Distributed computing architecture 1100 includes server devices 1108, 1110 that are configured to communicate, via network 1106, with programmable devices 1104a, 1104b, 1104c, 1104d, 1104e. Network 1106 may correspond to a local area network (LAN), a wide area network (WAN), a WLAN, a WWAN, a corporate intranet, the public Internet, or any other type of network configured to provide a communications path between networked computing devices. Network 1106 may also correspond to a combination of one or more LANs, WANs, corporate intranets, and/or the public Internet.

Although FIG. 11 only shows five programmable devices, distributed application architectures may serve tens, hundreds, or thousands of programmable devices. Moreover, programmable devices 1104a, 1104b, 1104c, 1104d, 1104e (or any additional programmable devices) may be any sort of computing device, such as a mobile computing device, desktop computer, wearable computing device, head-mountable device (HMD), network terminal, a mobile computing device, and so on. In some examples, such as illustrated by programmable devices 1104a, 1104b, 1104c, 1104e, programmable devices can be directly connected to network 1106. In other examples, such as illustrated by programmable device 1104d, programmable devices can be indirectly connected to network 1106 via an associated computing device, such as programmable device 1104c. In this example, programmable device 1104c can act as an associated computing device to pass electronic communications between programmable device 1104d and network 1106. In other examples, such as illustrated by programmable device 1104e, a computing device can be part of and/or inside a vehicle, such as a car, a truck, a bus, a boat or ship, an airplane, etc. In other examples not shown in FIG. 11, a programmable device can be both directly and indirectly connected to network 1106.

Server devices 1108, 1110 can be configured to perform one or more services, as requested by programmable devices 1104a-1104e. For example, server device 1108 and/or 1110 can provide content to programmable devices 1104a-1104e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 1108 and/or 1110 can provide programmable devices 1104a-1104e with access to software for database, search, computation, graphical, audio, video, World Wide Web/Internet utilization, and/or other functions. Many other examples of server devices are possible as well.

Computing Device Architecture

Figure 12:
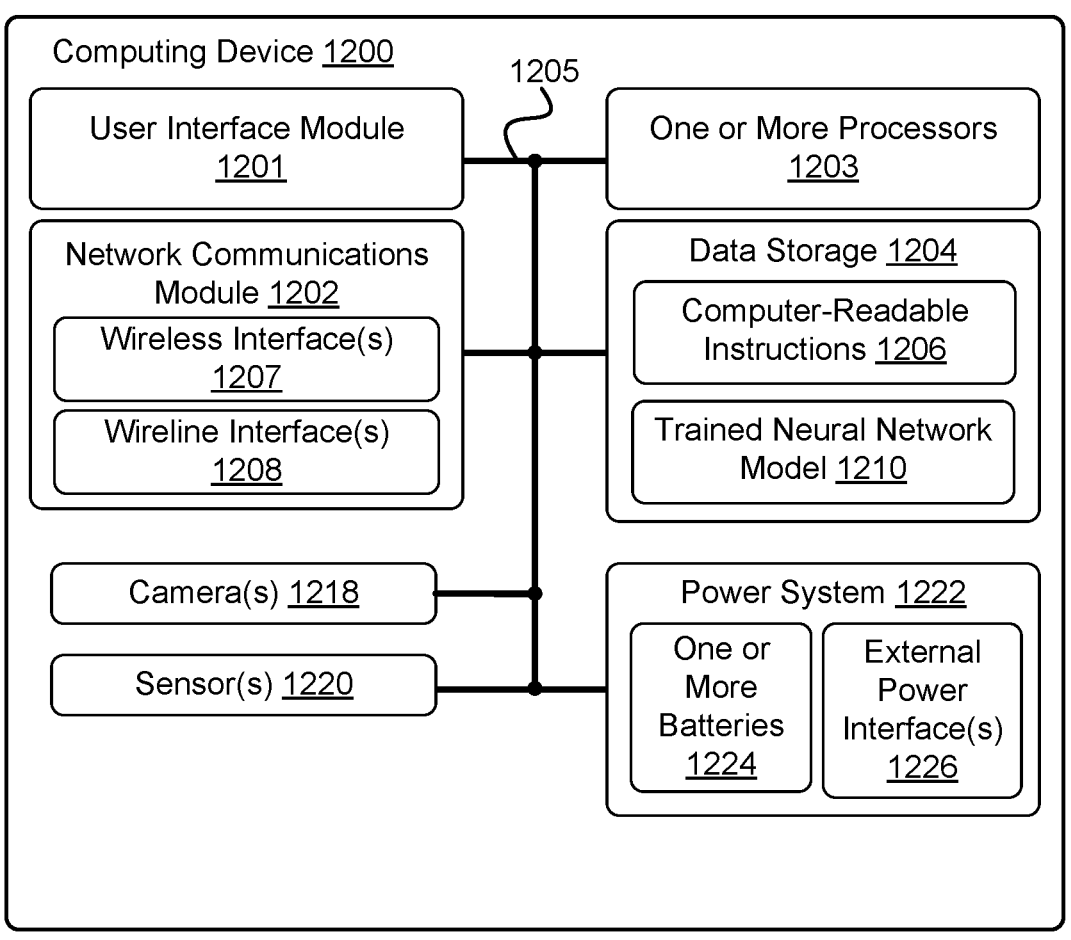
FIG. 12 is a block diagram of a computing device, in accordance with example embodiments.

FIG. 12 is a block diagram of an example computing device 1200, in accordance with example embodiments. In particular, computing device 1200 shown in FIG. 12 can be configured to perform at least one function of and/or related to a kernelized classification layer based neural network, and/or method 1500.

Computing device 1200 may include a user interface module 1201, a network communications module 1202, one or more processors 1203, data storage 1204, one or more camera(s) 1218, one or more sensors 1220, and power system 1222, all of which may be linked together via a system bus, network, or other connection mechanism 1205.

User interface module 1201 can be operable to send data to and/or receive data from external user input/output devices. For example, user interface module 1201 can be configured to send and/or receive data to and/or from user input devices such as a touch screen, a computer mouse, a keyboard, a keypad, a touch pad, a trackball, a joystick, a voice recognition module, and/or other similar devices. User interface module 1201 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 1201 can also be configured to generate audible outputs, with devices such as a speaker, speaker jack, audio output port, audio output device, earphones, and/or other similar devices. User interface module 1201 can further be configured with one or more haptic devices that can generate haptic outputs, such as vibrations and/or other outputs detectable by touch and/or physical contact with computing device 1200. In some examples, user interface module 1201 can be used to provide a graphical user interface (GUI) for utilizing computing device 1200, such as, for example, a graphical user interface of a mobile phone device.

Network communications module 1202 can include one or more devices that provide one or more wireless interface(s) 1207 and/or one or more wireline interface(s) 1208 that are configurable to communicate via a network. Wireless interface(s) 1207 can include one or more wireless transmitters, receivers, and/or transceivers, such as a Bluetooth™ transceiver, a Zigbee® transceiver, a Wi-Fi™ transceiver, a WiMAX™ transceiver, an LTE™ transceiver, and/or other type of wireless transceiver configurable to communicate via a wireless network. Wireline interface(s) 1208 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 1202 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 1203 can include one or more general purpose processors, and/or one or more special purpose processors (e.g., digital signal processors, tensor processing units (TPUs), graphics processing units (GPUs), application specific integrated circuits, etc.). One or more processors 1203 can be configured to execute computer-readable instructions 1206 that are contained in data storage 1204 and/or other instructions as described herein.

Data storage 1204 can include one or more non-transitory computer-readable storage media that can be read and/or accessed by at least one of one or more processors 1203. The one or more computer-readable storage media can include volatile and/or non-volatile storage components, such as optical, magnetic, organic or other memory or disc storage, which can be integrated in whole or in part with at least one of one or more processors 1203. In some examples, data storage 1204 can be implemented using a single physical device (e.g., one optical, magnetic, organic or other memory or disc storage unit), while in other examples, data storage 1204 can be implemented using two or more physical devices.

Data storage 1204 can include computer-readable instructions 1206 and perhaps additional data. In some examples, data storage 1204 can include storage required to perform at least part of the herein-described methods, scenarios, and techniques and/or at least part of the functionality of the herein-described devices and networks. In some examples, data storage 1204 can include storage for a trained neural network model 1210 (e.g., a model of trained neural networks such as kernelized classification layer based neural networks). In particular of these examples, computer-readable instructions 1206 can include instructions that, when executed by one or more processors 1203, enable computing device 1200 to provide for some or all of the functionality of trained neural network model 1210.

In some examples, computing device 1200 can include one or more camera(s) 1218. Camera(s) 1218 can include one or more image capture devices, such as still and/or video cameras, equipped to capture light and record the captured light in one or more images; that is, camera(s) 1218 can generate image(s) of captured light. The one or more images can be one or more still images and/or one or more images utilized in video imagery. Camera(s) 1218 can capture light and/or electromagnetic radiation emitted as visible light, infrared radiation, ultraviolet light, and/or as one or more other frequencies of light.

In some examples, computing device 1200 can include one or more sensors 1220. Sensors 1220 can be configured to measure conditions within computing device 1200 and/or conditions in an environment of computing device 1200 and provide data about these conditions. For example, sensors 1220 can include one or more of: (i) sensors for obtaining data about computing device 1200, such as, but not limited to, a thermometer for measuring a temperature of computing device 1200, a battery sensor for measuring power of one or more batteries of power system 1222, and/or other sensors measuring conditions of computing device 1200; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 1200, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 1200, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 1200, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 1220 are possible as well.

Power system 1222 can include one or more batteries 1224 and/or one or more external power interfaces 1226 for providing electrical power to computing device 1200. Each battery of the one or more batteries 1224 can, when electrically coupled to the computing device 1200, act as a source of stored electrical power for computing device 1200. One or more batteries 1224 of power system 1222 can be configured to be portable. Some or all of one or more batteries 1224 can be readily removable from computing device 1200. In other examples, some or all of one or more batteries 1224 can be internal to computing device 1200, and so may not be readily removable from computing device 1200. Some or all of one or more batteries 1224 can be rechargeable. For example, a rechargeable battery can be recharged via a wired connection between the battery and another power supply, such as by one or more power supplies that are external to computing device 1200 and connected to computing device 1200 via the one or more external power interfaces. In other examples, some or all of one or more batteries 1224 can be non-rechargeable batteries.

One or more external power interfaces 1226 of power system 1222 can include one or more wired-power interfaces, such as a USB cable and/or a power cord, that enable wired electrical power connections to one or more power supplies that are external to computing device 1200. One or more external power interfaces 1226 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 1226, computing device 1200 can draw electrical power from the external power source the established electrical power connection. In some examples, power system 1222 can include related sensors, such as battery sensors associated with the one or more batteries or other types of electrical power sensors.

Cloud-Based Servers

Figure 13:
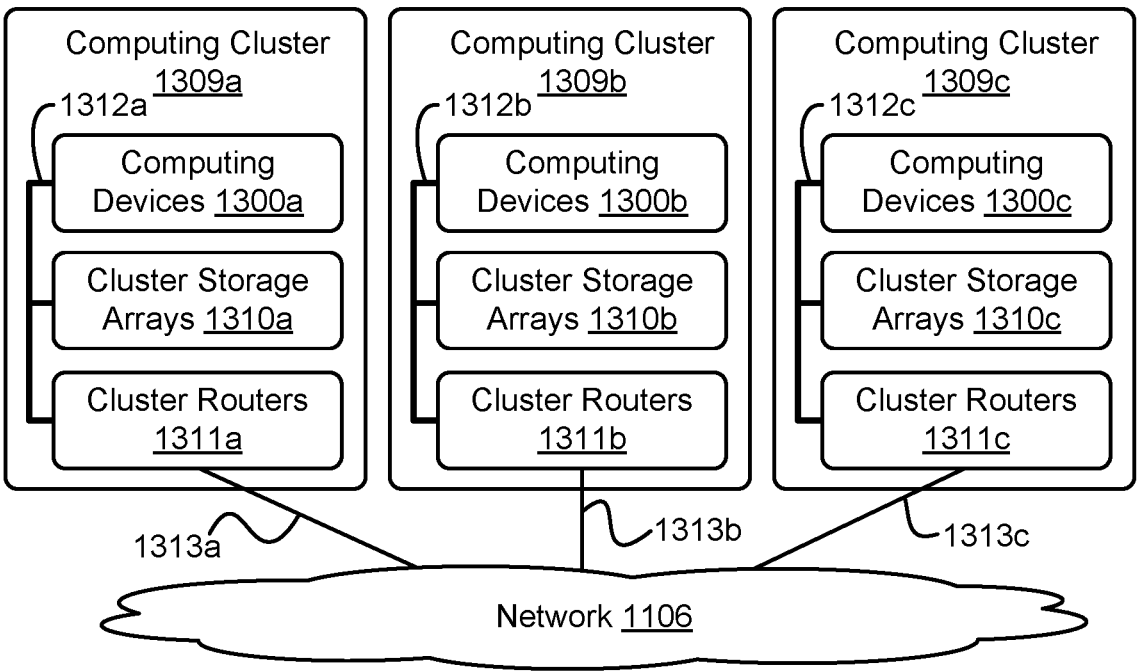
FIG. 13 depicts a network of computing clusters arranged as a cloud-based server system, in accordance with example embodiments.

FIG. 13 depicts a cloud-based server system in accordance with an example embodiment. In FIG. 13, functionality of a kernelized classification layer based neural network, and/or a computing device can be distributed among computing clusters 1309a, 1309b, 1309c. Computing cluster 1309a can include one or more computing devices 1300a, cluster storage arrays 1310a, and cluster routers 1311a connected by a local cluster network 1312a. Similarly, computing cluster 1309b can include one or more computing devices 1300b, cluster storage arrays 1310b, and cluster routers 1311b connected by a local cluster network 1312b. Likewise, computing cluster 1309c can include one or more computing devices 1300c, cluster storage arrays 1310c, and cluster routers 1311c connected by a local cluster network 1312c.

In some embodiments, computing clusters 1309a, 1309b, 1309c can be a single computing device residing in a single computing center. In other embodiments, computing clusters 1309a, 1309b, 1309c can include multiple computing devices in a single computing center, or even multiple computing devices located in multiple computing centers located in diverse geographic locations. For example, FIG. 13 depicts each of computing clusters 1309a, 1309b, 1309c residing in different physical locations.

In some embodiments, data and services at computing clusters 1309a, 1309b, 1309c can be encoded as computer readable information stored in non-transitory, tangible computer readable media (or computer readable storage media) and accessible by other computing devices. In some embodiments, computing clusters 1309a, 1309b, 1309c can be stored on a single disk drive or other tangible storage media, or can be implemented on multiple disk drives or other tangible storage media located at one or more diverse geographic locations.

In some embodiments, each of computing clusters 1309a, 1309b, and 1309c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1309a, for example, computing devices 1300a can be configured to perform various computing tasks of a conditioned, axial self-attention based neural network, and/or a computing device. In one embodiment, the various functionalities of a neural network, and/or a computing device can be distributed among one or more of computing devices 1300a, 1300b, 1300c. Computing devices 1300b and 1300c in respective computing clusters 1309b and 1309c can be configured similarly to computing devices 1300a in computing cluster 1309a. On the other hand, in some embodiments, computing devices 1300a, 1300b, and 1300c can be configured to perform different functions.

In some embodiments, computing tasks and stored data associated with a neural network, and/or a computing device can be distributed across computing devices 1300a, 1300b, and 1300c based at least in part on the processing requirements of a neural network, and/or a computing device, the processing capabilities of computing devices 1300a, 1300b, 1300c, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 1310a, 1310b, 1310c of computing clusters 1309a, 1309b, 1309c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a conditioned, axial self-attention based neural network, and/or a computing device can be distributed across computing devices 1300a, 1300b, 1300c of computing clusters 1309a, 1309b, 1309c, various active portions and/or backup portions of these components can be distributed across cluster storage arrays 1310a, 1310b, 1310c. For example, some cluster storage arrays can be configured to store one portion of the data of a first layer of a neural network, and/or a computing device, while other cluster storage arrays can store other portion(s) of data of second layer of a neural network, and/or a computing device. Also, for example, some cluster storage arrays can be configured to store the data of an encoder of a neural network, while other cluster storage arrays can store the data of a decoder of a neural network. Additionally, some cluster storage arrays can be configured to store backup versions of data stored in other cluster storage arrays.

Cluster routers 1311a, 1311b, 1311c in computing clusters 1309a, 1309b, 1309c can include networking equipment configured to provide internal and external communications for the computing clusters. For example, cluster routers 1311a in computing cluster 1309a can include one or more internet switching and routing devices configured to provide (i) local area network communications between computing devices 1300a and cluster storage arrays 1310a via local cluster network 1312a, and (ii) wide area network communications between computing cluster 1309a and computing clusters 1309b and 1309c via wide area network link 1313a to network 1106. Cluster routers 1311b and 1311c can include network equipment similar to cluster routers 1311a, and cluster routers 1311b and 1311c can perform similar networking functions for computing clusters 1309*b* and 1309*b* that cluster routers 1311*a* perform for computing cluster 1309*a*.

In some embodiments, the configuration of cluster routers 1311*a*, 1311*b*, 1311*c* can be based at least in part on the data communication requirements of the computing devices and cluster storage arrays, the data communications capabilities of the network equipment in cluster routers 1311*a*, 1311*b*, 1311*c*, the latency and throughput of local cluster networks 1312*a*, 1312*b*, 1312*c*, the latency, throughput, and cost of wide area network links 1313*a*, 1313*b*, 1313*c*, and/or other factors that can contribute to the cost, speed, fault-tolerance, resiliency, efficiency and/or other design criteria of the moderation system architecture.

Example Methods of Operation

FIG. 14 is a flowchart of a method 1400, in accordance with example embodiments. Method 1400 can be executed by a computing device, such as computing device 1300. Method 1400 can begin at block 1410, where the method involves receiving, by a computing device, training data to train a neural network, wherein the training data comprises a plurality of inputs and a plurality of corresponding labels.

At block 1420, the method involves mapping, by a representation learner of the neural network, the plurality of inputs to a plurality of feature vectors.

At block 1430, the method involves training a kernelized classification layer of the neural network to perform non-linear classification of an input feature vector into one of a plurality of classes, wherein the kernelized classification layer is based on a kernel which enables the nonlinear classification, and wherein the kernel is selected from a space of positive definite kernels based on application of a nonlinear softmax loss function to the plurality of feature vectors and the plurality of corresponding labels.

At block 1440, the method involves outputting a trained neural network comprising the representation learner and the trained kernelized classification layer.

In some embodiments, the nonlinear softmax loss function may be a combination of a softmax loss function and a cross entropy loss function.

In some embodiments, the method may further involve determining, by a backpropagation algorithm, a gradient of the nonlinear softmax loss function. In such embodiments, the method may also involve determining one or more hyperparameters of the kernel by applying the determined gradient in a gradient descent based technique. In some embodiments, the method may additionally involve regularizing the one or more hyperparameters based on a rectified linear unit (ReLU) operation.

In some embodiments, the representation learner may be associated with one or more representation parameters learnable by the neural network, and wherein the determining of the one or more hyperparameters, and a learning of the one or more representation parameters, may be performed jointly.

In some embodiments, one or more of a training of the representation learner or the training of the kernelized classification layer may be performed at the computing device.

FIG. 15 is another flowchart of a method 1500, in accordance with example embodiments. Method 1500 can be executed by a computing device, such as computing device 1300. Method 1500 can begin at block 1510, where the method involves receiving, by a computing device, input data for classification.

At block 1520, the method involves mapping, by a representation learner of the neural network, the input data to a plurality of feature vectors.

At block 1530, the method involves applying a kernelized classification layer of the neural network to perform a nonlinear classification of the plurality of feature vectors into one or more classes, the neural network having been trained to select a kernel for the kernelized classification layer from a space of positive definite kernels based on application of a nonlinear softmax loss function to training data.

At block 1540, the method involves predicting one or more labels for the input data based on the one or more classes.

In some embodiments, the representation learner may include one or more of a convolution layer, a max-pooling layer, or a fully connected layer.

In some embodiments, the kernelized classification layer may be a fully connected layer of the neural network.

In some embodiments, the method may involve receiving, by the computing device, particular input data for classification. In such embodiments, the method may involve obtaining, by the computing device, a first neural network with the representation learner and a softmax classification layer. The method may further involve replacing the softmax classification layer with a particular kernelized classification layer to convert the first neural network to a particular neural network. The method may additionally involve applying the particular kernelized classification layer of the particular neural network to predict a particular label for the particular input data. In some embodiments, the method may also involve training the particular neural network to select a particular kernel for the particular kernelized classification layer.

In some embodiments, the method may involve applying the neural network to a transfer learning task.

In some embodiments, the method may involve applying the neural network to a knowledge distillation task.

In some embodiments, the method may involve applying the neural network to an object detection task.

In some embodiments, the method may involve applying the neural network to a semantic image segmentation task.

In some embodiments, the method may involve obtaining a trained neural network at the computing device. The method may further involve applying the trained neural network as obtained to the predicting of the one or more labels.

In some embodiments, the predicting of the one or more labels for the input data may involve determining, by the computing device, a request to classify the input data. The method may also involve sending the request to classify the input data from the computing device to a second computing device, the second computing device comprising a trained version of the neural network. The method may additionally involve, after sending the request, the computing device receiving, from the second computing device, the one or more labels for the input data.

In some embodiments, the method may involve providing the one or more labels for the input data using the computing device.

In some embodiments, the nonlinear softmax loss function may be a combination of a softmax loss function and a cross entropy loss function.

In some embodiments, the method may involve joint training of the representation learner and the kernelized classification layer.

A kernelized classification layer for deep neural networks is described. This classification layer classifies feature vectors in a high dimensional RKHS while automatically learning an optimal kernel that enables such a high-dimensional embedding. As demonstrated via experiments and evaluations, consistent and substantial accuracy improvements may be achieved in several applications, including, for example, image classification, transfer learning, distillation, and active learning. These accuracy improvements strongly support a usefulness of a kernelized classification layer in detecting nonlinear patterns in feature vectors.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are provided for explanatory purposes and are not intended to be limiting, with the true scope being indicated by the following claims.

What is claimed is:

1. A computer-implemented method for improving an accuracy of classification related functioning of a neural network, comprising:

receiving, by a computing device, training data to train the neural network, wherein the training data comprises a plurality of inputs and a plurality of corresponding labels;

mapping, by a representation learner of the neural network, the plurality of inputs to a plurality of feature vectors;

training a kernelized classification layer of the neural network to perform nonlinear classification of an input feature vector into one of a plurality of classes, wherein the kernelized classification layer is based on a kernel which enables the nonlinear classification, and comprising:

automatically learning the kernel based on a space of positive definite kernels by determining a plurality of learnable coefficients of a finite series representation of the kernel, wherein the coefficients are automatically learned based on an application of a nonlinear softmax loss function to the plurality of feature vectors and the plurality of corresponding labels, and wherein the automatic kernel learning is configured to learn an optimal kernel suitable for a given task; and outputting an improved trained neural network comprising the representation learner and the trained kernelized classification layer comprising the optimal kernel, wherein the improved trained neural network is configured to perform the given task on another input.

2. The computer-implemented method of claim 1, wherein the nonlinear softmax loss function is a combination of a softmax loss function and a cross entropy loss function.

3. The computer-implemented method of claim 1, further comprising:

determining, by a backpropagation algorithm, a gradient of the nonlinear softmax loss function; and determining one or more hyperparameters of the kernel by applying the determined gradient in a gradient descent based technique.

4. The computer-implemented method of claim 3, further comprising:

regularizing the one or more hyperparameters based on a rectified linear unit (ReLU) operation.

5. The computer-implemented method of claim 3, wherein the representation learner is associated with one or more representation parameters learnable by the neural network, and wherein the determining of the one or more hyperparameters, and a learning of the one or more representation parameters, is performed jointly.

6. The computer-implemented method of claim 1, wherein one or more of a training of the representation learner or the training of the kernelized classification layer is performed at the computing device.

7. The computer-implemented method of claim 1, wherein the nonlinear softmax loss function is applied to a Reproducing Kernel Hilbert Space (RKHS) embedding of the plurality of feature vectors.

8. The computer-implemented method of claim 1, wherein the given task is one or more of an image classification task, a transfer learning task, a knowledge distillation task, or an active learning task.

9. A computer-implemented method for an improved classification performed by a neural network, comprising:

receiving, by a computing device, input data for classification;

mapping, by a representation learner of the neural network, the input data to a plurality of feature vectors;

applying a kernelized classification layer of the neural network to perform a nonlinear classification of the plurality of feature vectors into one or more classes, the neural network having been trained to automatically learn a kernel for the kernelized classification layer from a space of positive definite kernels by determining a plurality of learnable coefficients of a finite series representation of the kernel, wherein the coefficients are automatically learned based on an application of a nonlinear softmax loss function to training data, and automatic kernel learning being configured to learn an optimal kernel suitable for a given task; and predicting, for the given task and by the kernelized classification layer comprising the optimal kernel, one or more labels for the input data based on the one or more classes.

10. The computer-implemented method of claim 9, wherein the representation learner comprises one or more of a convolution layer, a max-pooling layer, or a fully connected layer.

11. The computer-implemented method of claim 9, wherein the kernelized classification layer is a fully connected layer of the neural network.

12. The computer-implemented method of claim 9, further comprising:

receiving, by the computing device, particular input data for classification;

obtaining, by the computing device, a first neural network with the representation learner and a softmax classification layer;

replacing the softmax classification layer with a particular kernelized classification layer to convert the first neural network to a particular neural network; and applying the particular kernelized classification layer of the particular neural network to predict a particular label for the particular input data.

13. The computer-implemented method of claim 12, further comprising:

training the particular neural network to select a particular kernel for the particular kernelized classification layer.

14. The computer-implemented method of claim 9, further comprising:

applying the neural network to a transfer learning task.

15. The computer-implemented method of claim 9, further comprising:

applying the neural network to a knowledge distillation task.

16. The computer-implemented method of claim 9, further comprising:

applying the neural network to a semantic image segmentation task.

17. The computer-implemented method of claim 9, wherein the predicting of the one or more labels for the input data further comprises:

obtaining a trained neural network at the computing device; and applying the trained neural network as obtained to the predicting of the one or more labels.

18. The computer-implemented method of claim 9, wherein the predicting of the one or more labels for the input data comprises:

determining, by the computing device, a request to classify the input data;

sending the request to classify the input data from the computing device to a second computing device, the second computing device comprising a trained version of the neural network; and after sending the request, the computing device receiving, from the second computing device, the one or more labels for the input data.

19. The computer-implemented method of claim 9, further comprising:

providing the one or more labels for the input data using the computing device.

20. The computer-implemented method of claim 9, wherein the nonlinear softmax loss function is a combination of a softmax loss function and a cross entropy loss function.

21. The computer-implemented method of claim 9, further comprising:

joint training of the representation learner and the kernelized classification layer.

22. A computing device for applying an improved classification performed by a neural network, comprising:

one or more processors; and data storage, wherein the data storage has stored thereon computer-executable instructions that, when executed by the one or more processors, cause the computing device to carry out operations comprising:

receiving, by the computing device, input data for classification;

mapping, by a representation learner of the neural network, the input data to a plurality of feature vectors;

applying a kernelized classification layer of the neural network to perform a nonlinear classification of the plurality of feature vectors into one or more classes, the neural network having been trained to automatically learn a kernel for the kernelized classification layer from a space of positive definite kernels by determining a plurality of learnable coefficients of a finite series representation of the kernel, wherein the coefficients are automatically learned based on an application of a nonlinear softmax loss function to training data, and automatic kernel learning being configured to learn an optimal kernel suitable for a given task; and predicting, for the given task and by the kernelized classification layer comprising the optimal kernel, one or more labels for the input data based on the one or more classes.

\* \* \* \* \*